US006512341B2

(12) United States Patent
Matsushiro et al.

(10) Patent No.: US 6,512,341 B2
(45) Date of Patent: Jan. 28, 2003

(54) APPARATUS AND METHOD FOR DRIVING A BRUSHLESS MOTOR

(75) Inventors: Hideo Matsushiro, Kusatsu (JP); Keizo Matsui, Otsu (JP); Kazushige Narazaki, Katano (JP); Toru Tazawa, Ibaraki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 50 days.

(21) Appl. No.: 09/902,258

(22) Filed: Jul. 11, 2001

(65) Prior Publication Data

US 2002/0030462 A1 Mar. 14, 2002

(30) Foreign Application Priority Data

Jul. 14, 2000 (JP) ........................................ 2000-214063
May 30, 2001 (JP) ........................................ 2001-162544

(51) Int. Cl.[7] .............................................. H02P 7/06
(52) U.S. Cl. ........................ 318/254; 318/138; 318/439; 318/459; 388/907.5
(58) Field of Search ................................ 318/138, 254, 318/439, 720, 721, 722, 724, 459, 500; 388/928.1, 907.5

(56) References Cited

U.S. PATENT DOCUMENTS 4,364,004 A * 12/1982 Bourbeau ..................... 318/721
4,922,169 A * 5/1990 Freeman ...................... 318/138
5,254,914 A * 10/1993 Dunfield et al. ............. 318/138
5,744,921 A * 4/1998 Makaran ...................... 318/138
5,783,917 A * 7/1998 Takekawa .................... 318/254
5,969,491 A * 10/1999 Viti et al. .................... 318/138

FOREIGN PATENT DOCUMENTS

JP          8-84493       3/1996
JP          2786863       5/1998

* cited by examiner

*Primary Examiner*—Rita Leykin
(74) *Attorney, Agent, or Firm*—Wenderoth, Lind & Ponack, L.L.P.

(57) ABSTRACT

The invention provides an motor drive apparatus comprising a detector for detecting a terminal voltage in a non-energized phase and a detector for detecting a DC voltage applied to the main line of an inverter. The rotation of the brushless motor is controlled by specifying the inverter circulating current period from the terminal voltage and the DC voltage and calculating the magnetic pole position of the rotor from the terminal voltage after the end of the inverter circulating current period and a waveform of the terminal voltage predetermined from the characteristics of the brushless motor. As a result, the brushless motor can be rotated stably throughout a wide revolution range from low to high speeds.

25 Claims, 25 Drawing Sheets

APPARATUS AND METHOD FOR DRIVING A BRUSHLESS MOTOR

BACKGROUND OF THE INVENTION

1. Field of the Invention

The present invention relates to a sensor-less driving technique of detecting a position of a magnetic pole of a rotor with not a position detecting means such as a Hall elements but an induced voltage developed in windings of a stator. Particularly, the invention relates to an apparatus and a method for driving a brushless motor through detecting the magnetic pole position of the rotor without the use of a sensor, in which a circulating current period of an inverter is determined from the terminal voltage at a phase which is not energized (non-energized phase) and the DC voltage applied to the main line of the inverter, and the terminal voltage after the inverter circulating current period and the waveform of the terminal voltage predetermined from the characteristics of the brushless motor are compared to determine the position of the rotor.

2. Description of the Related Art

For controlling the rotation of a brushless motor, it is essential to allow an action of commutation with the relation between the magnetic pole position of the rotor and the winding to be energized. Output torque of the brushless motor is determined by an interaction of the force of magnetic flux of magnets mounted to the rotor and the force of magnetic flux of a current flown through the windings of the stator. It is hence necessary for driving and controlling the rotation of the brushless motor to feed a current to a particular position on the windings where the magnetic flux developed by the magnetic poles of the rotor is maximum and thus generate an optimum force of torque. Also, the rotation of the brushless motor can be controlled by shifting a phase to be energized (energized phase) from one to another along the magnetic pole position of the rotor. When the timing of shifting or commutation is lagged greatly from the location at the maximum magnetic flux, the force of torque will be declined. In the worst case, the rotation of the brushless motor will be out of tune and finally stalled.

Therefore, the rotation of the brushless motor has to be controlled through detecting exactly the magnetic pole position of the rotor with the use of any means. Some sensor-less driving methods have been proposed for detecting the magnetic pole position of the rotor with the use of not a position detecting means such as a Hall element but measurement of an induced voltage developed in the windings of the stator. One of the conventional methods of detecting the magnetic pole position of the rotor with no use of a sensor is illustrated in the form of a system in FIGS. 23 and 24.

The system shown in FIG. 23 comprises an alternating current source 1, a converter 2, an inverter 3, a brushless motor 5, a stator 6, a rotor 7, a controller 8, a drive circuit 9, a reference voltage generator 16, and a group of comparators 17$u$, 17$v$ and 17$w$. The brushless motor 5 includes the stator 6 having three phase windings 6$u$, 6$v$ and 6$w$ connected to each other in a Y connection about an neutral point and the rotor 7 equipped with magnets. The U-phase winding 6$u$, V-phase winding 6$v$, and W-phase winding 6$w$ are connected at their free ends to a U-phase terminal 11$u$, a V-phase terminal 11$v$, and a W-phase terminal 11$w$ respectively.

An AC voltage released from the alternating current source 1 is converted by the converter 2 into a DC voltage (Vdc) which is then transferred to the inverter 3. The inverter 3 comprises three series circuits for U-phase, V-phase, and W-phase, each circuit having a pair of switching elements connected between the upstream and the downstream in the current flow. The three series circuits are fed with a DC voltage (Vdc) from the converter 2. The U-phase series circuit includes a pair of transistors 12$u$ and 13$u$ as the upstream switching element and the downstream switching element respectively. Equally, the V-phase series circuit includes a pair of transistors 12$v$ and 13$v$ as the upstream switching element and the downstream switching element respectively while the W-phase series circuit includes a pair of transistors 12$w$ and 13$w$ as the upstream switching element and the downstream switching element respectively. The free-wheel diodes 14$u$, 14$v$, 14$w$ and 15$u$, 15$v$, 15$w$ are connected in parallel with the transistors at both the upstream and the downstream.

In the inverter 3, a connecting node between transistors 12$u$ and 13$u$ is connected to a terminal 11$u$ of the brushless motor 5. Connecting nodes between the transistors 12$v$ and 13$v$, and 12$w$ and 13$w$ are connected to corresponding terminals 11$v$ and 11$w$, respectively. The inverter 3 turns on and off the transistors in a sequence to energize the phase windings 6$u$, 6$v$, and 6$w$ of the brushless motor 5. While the non-energized period is provided for disconnecting the paired transistors at the upstream and downstream at once, the magnetic pole position of the rotor 7 is detected.

Each of the comparators 17$u$, 17$v$ and 17$w$ compares the terminal voltage (induced voltage) developed at the corresponding terminal 11$u$, 11$v$, or 11$w$ of the brushless motor 5 with a reference voltage (e.g. a half of the DC voltage Vdc) from reference voltage generator 16. A resultant signal which changes at the intersection is released as the position detecting signal to the controller 8 as shown in FIG. 24. The controller 8 generates a set of control signals (u+, v+, w+, u−, v−, and w−) for energizing in a sequence the phase winding 6$u$, 6$v$, and 6$w$ of the brushless motor 5 on the basis of the change point of the position detecting signal. The control signals are fed into the drive circuit 9. In this manner, the rotation of the brushless motor 5 can be controlled.

Another example of the conventional sensor-less driving method is disclosed in Japanese Patent No.2786863. That method employs an A/D converter for sampling the terminal voltage at the non-energized phase of a brushless motor, determining the gradient of the induced voltage from two samples, and performing an action of commutation from the intersection between the gradient and a half of the DC voltage.

In the above described conventional method, it is however essential to have the intersection between the induced voltage and the reference voltage during the non-energized period. This will limit the action of controlling the brushless motor over the energized period. More specifically, the energized period should be within an angle of 120 degrees and the energization at an angle greater than 120 degrees will hardly be permitted.

The system disclosed in Japanese Patent No.2786863 requires two or more samples of the terminal voltage at the non-energized phase, which has the following problem. When the brushless motor is rotated at a higher speed and two or more samples of the terminal voltage can not be detected, no gradient of the induced voltage can not be calculated. Thus, no timing of commutation is determined, and hence the movement of the brushless motor stalls.

SUMMARY OF THE INVENTION

It is an object of the present invention to provide a driving control scheme for controlling the rotation of a brushless motor throughout its range from low high speeds through accurately identifying the magnetic pole position of a rotor, thereby eliminating the above disadvantages.

A brushless motor driving apparatus according to the present invention is an apparatus for driving a brushless motor which includes a stator having a multiple-phase windings and a rotor having multiple-pole magnets. The apparatus detects a magnetic pole position of the rotor and switching the winding of the stator to be energized seriatim according to the detected magnetic pole position through an inverter. The apparatus comprises a DC voltage detector, a terminal voltage detector, a circulating current period determining section, a memory, and a magnetic pole position detector. The DC voltage detector detects a DC voltage applied to a main line of the inverter. The terminal voltage detector detects a terminal voltage in a non-energizing phase of the windings of the stator. The circulating current period determining section determines a circulating current period for which a circulating current is flowing according to the DC voltage and the terminal voltage. The memory stores data of a waveform of the terminal voltage predetermined from characteristics of the brushless motor. The magnetic pole position detector identifies the magnetic pole position of the rotor based on the terminal voltage after the end of the circulating current period and the waveform of a terminal voltage predetermined from characteristics of the brushless motor.

A brushless motor driving method according to the present invention is a method of driving a brushless motor which includes a stator having a multiple-phase windings and a rotor having multiple-pole magnets. The method comprises detecting a magnetic pole position of the rotor and switching the winding of the stator to be energized seriatim according to the detected magnetic pole position through an inverter. The method comprises detecting a DC voltage applied to a main line of the inverter, detecting a terminal voltage in a non-energizing phase of the windings of the stator, determining a circulating current period for which a circulating current is flowing according to the DC voltage and the terminal voltage, and identifying the magnetic pole position of the rotor based on the terminal voltage after the end of the circulating current period and a waveform of a terminal voltage predetermined from characteristics of the brushless motor.

The present invention allows the magnetic pole position of the rotor to be identified without calculating the intersection between the DC voltage and a reference voltage, e.g. ½ the DC voltage, thus stably controlling the rotation of the brushless motor throughout its range from low speeds to high speeds.

DETAILED DESCRIPTION OF THE PREFERRED EMBODIMENTS

Some embodiments of the present invention will be described in more detail referring to the accompanying drawings. Throughout the drawings, like components are denoted by like numerals.

First Embodiment

Figure 1:
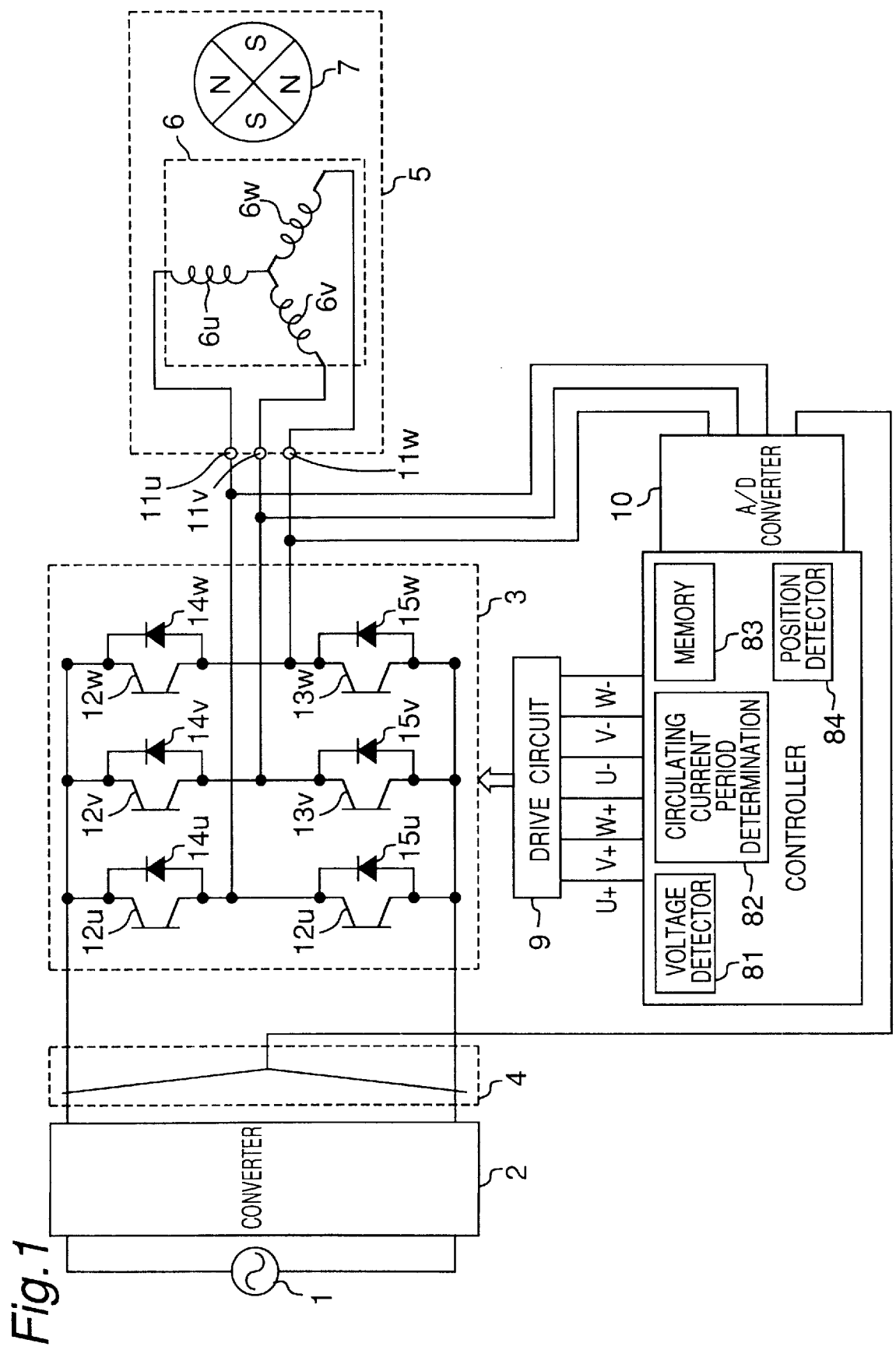
FIG. 1 is a block diagram of a system showing one embodiment of the present invention.

FIG. 1 is a block diagram of a motor drive system according to the first embodiment of the present invention.

As shown in FIG. 1, the system comprises an alternating current source 1, a converter 2, an inverter 3, a DC voltage detector 4, a controller 8, a drive circuit 9, and an A/D converter 10. A brushless motor 5 comprises a stator 6 and a rotor 7. The brushless motor 5 comprises the stator 6 having three phase windings 6u, 6v and 6w connected to each other in Y connection about the neutral point and wound thereon and the rotor 7 having magnets mounted thereon. The U-phase winding 6u, the V-phase winding 6v, and the W-phase winding 6w are connected at their free end to a U-phase terminal 11u, a V-phase terminal 11v, and a W-phase terminal 11w, respectively.

An AC voltage received from the AC source 1 is converted by the converter 2 into a DC voltage which is then transferred to the inverter 3. The inverter 3 comprises three series circuits for U-phase, V-phase, and W-phase, each series circuit having a pair of switching elements connected in series between the upstream and the downstream in the current path. Each of the series circuits is supplied with the DC voltage from the converter 2. The series circuit for U-phase comprises a transistor 12u as the upstream switching element and a transistor 13u as the downstream switching element. Similarly, the series circuit for V-phase comprises a transistor 12v as the upstream switching element and a transistor 13v as the downstream switching element while the series circuit for W-phase comprises a transistor 12w as the upstream switching element and a transistor 13w as the downstream switching element. In addition, free-wheel diodes 14u, 14v, 14w and 15u, 15v, 15w are connected in parallel with the upstream transistors and the downstream transistors respectively.

In the inverter 3, the connecting node between the transistors 12u and 13u in the U-phase series circuit, the connecting node between the transistors 12v and 13v in the V-phase series circuit, and the connecting node between the transistors 12w and 13w in the W-phase series circuit are connected to the terminals 11u, 11v and 11w of the brushless motor 5, respectively. The inverter 3 energizes the three phase windings 6u, 6v and 6w of the brushless motor 5 serially through switching on and off their respective transistors.

The DC voltage detector 4 is disposed on the input side of the inverter 3. DC voltage detected by the DC voltage detector 4 is fed into the inverter 3 and the A/D converter 10. The A/D converter 10 is also fed with terminal (induction) voltages from the terminals 11u, 11v, and 11w of the brushless motor 5 for sampling.

The controller 8 when receiving the DC voltage from the DC voltage detecting means 4 and the terminal voltages from the brushless motor 5 via the A/D converter 10 generates a set of control signals (U+, V+, W+, U−, V−, and W−) which determine the switching action of the transistors in the inverter 3 and is transferred to the drive circuit 9. The drive circuit 9 is responsive to the switching action control signals to determine the switching action of the transistors in the inverter 3.

The controller 8 comprises a terminal voltage detector 81 for detecting the terminal voltages at the non-energized phase of the brushless motor 5, a circulating current period determiner 82 for comparing the terminal voltage with the DC voltage applied to the main line of the inverter to determine the period of inverter circulating current, and a memory 83 for storing a waveform data of the terminal voltage of the brushless motor 5 induced in the windings of the stator 6 mainly by the action of the magnets of the rotor 7. The waveform data of the induced voltage can preliminarily be calculated as the terminal voltage waveform from the characteristics of the brushless motor 5 and used for detecting the magnetic pole position as will be explained later in more detail. The waveform data is stored in the form of a data table in the memory 83. The controller 8 also includes a magnetic pole position detector 84 for detecting the magnetic pole position using the terminal voltage after the end of the inverter circulating current period and the terminal voltage waveform determined from the characteristics of the brushless motor 5. The controller 8 and the A/D converter 10 may be implemented by one-chip microcomputer and their action will be explained later in more detail.

Assuming that the phase windings 6u, 6v, and 6w of the stator 6 are energized at the timing of ideal commutation and thus the rotor 7 runs at a uniform speed, the action of the above described motor drive system will now be described.

Figure 2:
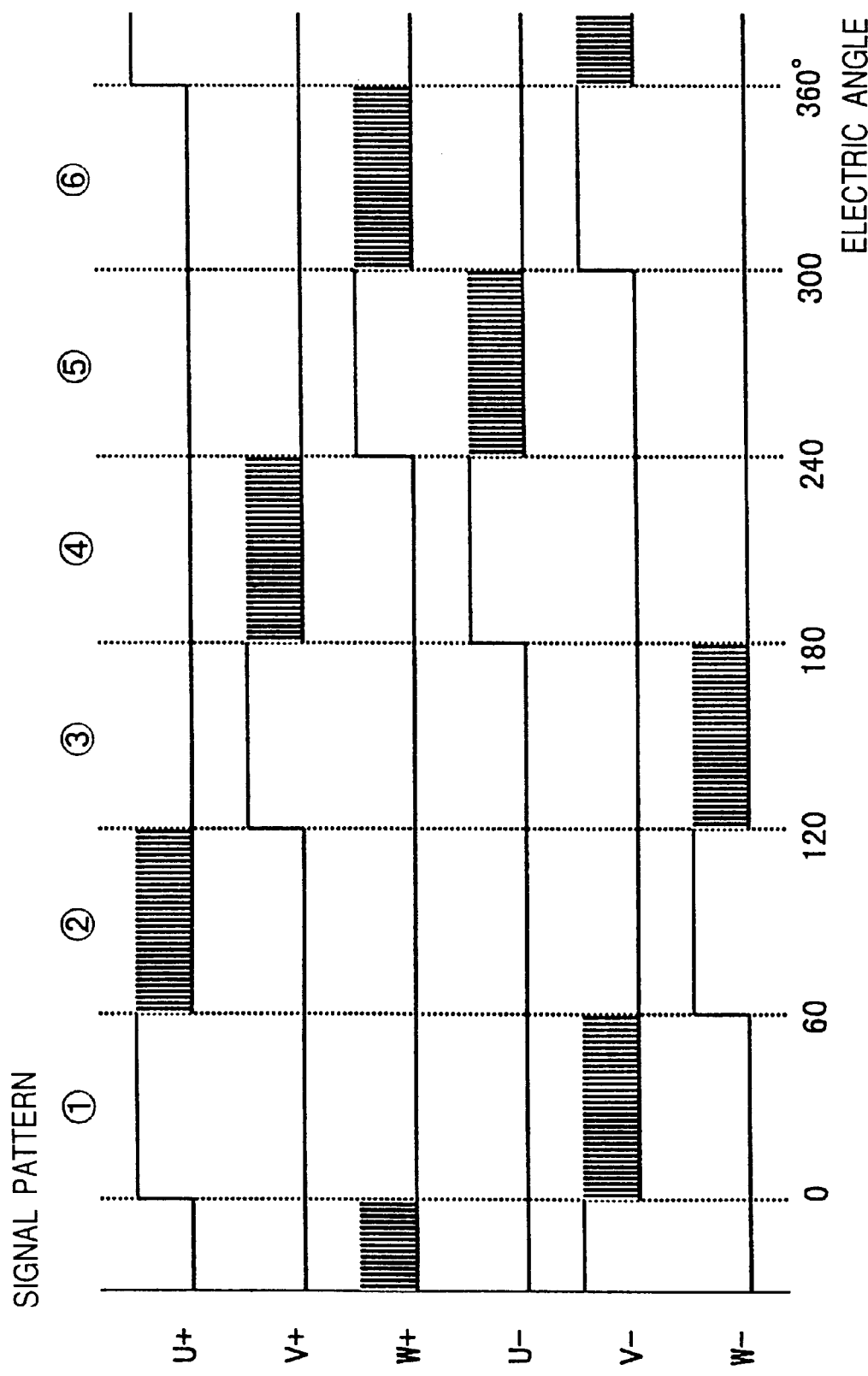
FIG. 2 is a timing chart of switching action control signals of the inverter at 120-degree energizing in the system shown in FIG. 1.

FIG. 2 illustrates the control signals U+, V+, W+, U−, V−, and W− delivered from the controller 8 for determining the switching action of the transistors in the inverter 3. The switching action control signals substantially conduct a so called, 120-degree energizing driving action. Also, the control signals execute a PWM control for controlling the energizing rate of the winding terminal voltage. As shown in FIG. 2, the signal U+ is provided for controlling the action of the U-phase transistor 12u while the signal U− is provided for controlling the U-phase transistor 13u. The other control signals for V-phase and W-phase are similar. The control signals is treated with "active high".

Figure 3:
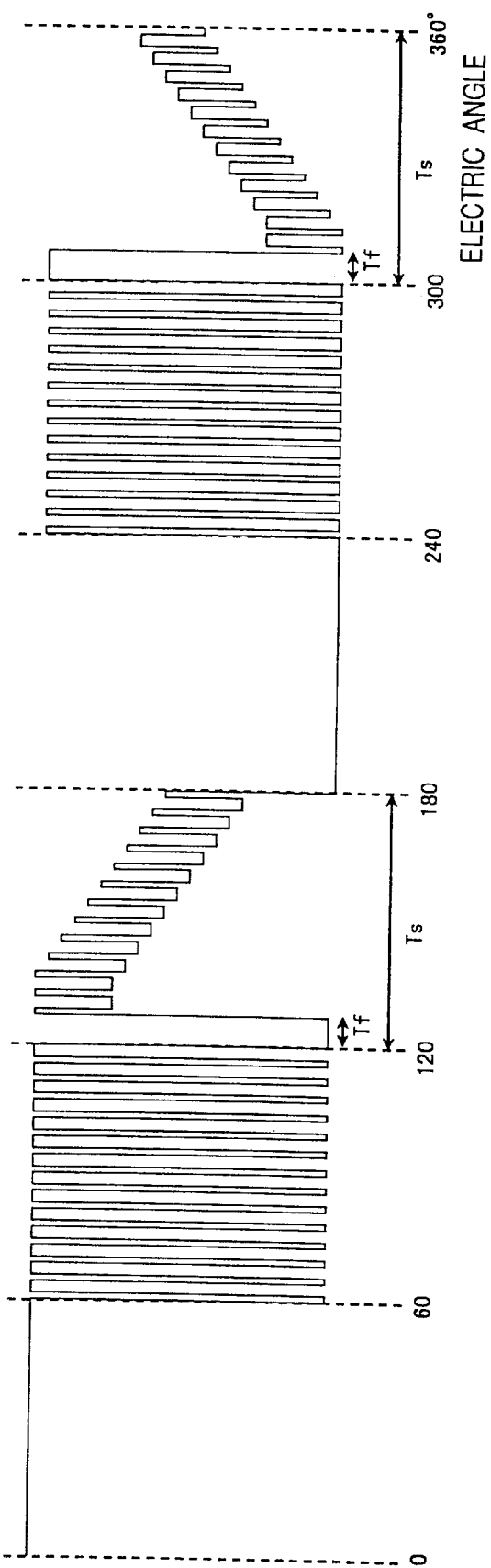
FIG. 3 is a diagram of the waveform of a U-phase terminal voltage at the 120-degree energizing in the system shown in FIG. 1.

FIG. 3 shows the waveform of a terminal voltage at the U-phase terminal 11u while the brushless motor 5 is driven using the control signals shown in FIG. 2. The terminal voltage waveform includes a driving voltage for rotation of the brushless motor 5 and a voltage induced by the rotation of the motor 5. As the voltage induced by the rotation of the brushless motor 5 is varied depending on the speed of the rotation and the driving current, the induced voltage is an effective information to detect the magnetic pole position of the rotor 7. In the 120-degree energizing mode shown in FIG. 2, the voltage induced by the rotation of the brushless motor 5 may appear throughout a period Ts shown in FIG. 3.

In the period Ts, the voltage is fixed at a DC voltage level or zero during an period (inverter circulating current period) Tf for which a current flows through the free-wheel diodes 14u and 14v at the commutation. As the inverter 3 is chopped by the PWM control, for example, when the electric angle is in a range from 300 to 360 degrees, the voltage can be used as an effective information only during the period while the transistor 12w is turned on and the W-V phases are supplied with a current.

A method of measuring a voltage induced by the brushless motor, which is an effective data for detecting the magnetic pole position, according to the first embodiment of the present invention will be explained referring to FIG. 4.

Figure 4:
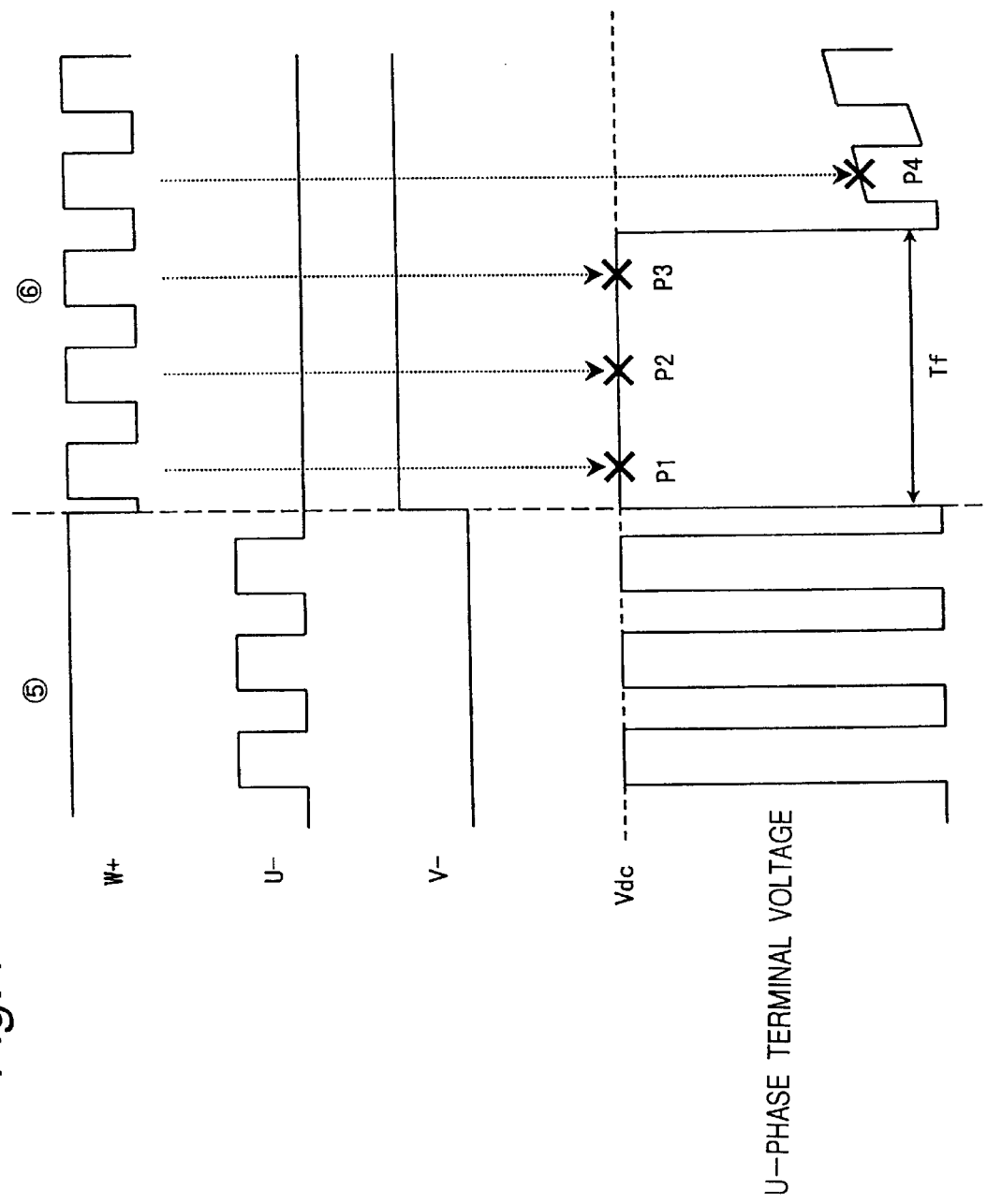
FIG. 4 is a waveform diagram when the energized phases are switched from W-U phases to W-V phases at the 120-degree energizing in the system shown in FIG. 1.

FIG. 4 illustrates the state of the transistors 12w, 13u, and 13v and the waveform of a voltage at the U-phase terminal 11u when the signal pattern for determining the switching action of the transistors is shifted from the period ⑤ to the period ⑥ shown in FIG. 2 or from the W-U phase energization to the W-V phase energization. When the energization has been shifted, the DC voltage and the U-phase terminal voltage are sampled by the A/D converter 10 while the transistor 12w being turned on. The samples of the terminal voltage (denoted by x) are compared with the DC voltage. When the two voltages are equal, it is determined that the inverter circulating current period where the free-wheel diode 14u is energized (P1 to P3 in FIG. 4) is going. Whenever the transistor 12w is switched on, the terminal voltage is sampled and compared. When the terminal voltage is sufficiently smaller than the DC voltage level (P4), it is judged that the inverter circulating current period is finished and the measured voltage is a voltage induced in the brushless motor 5.

Figure 5:
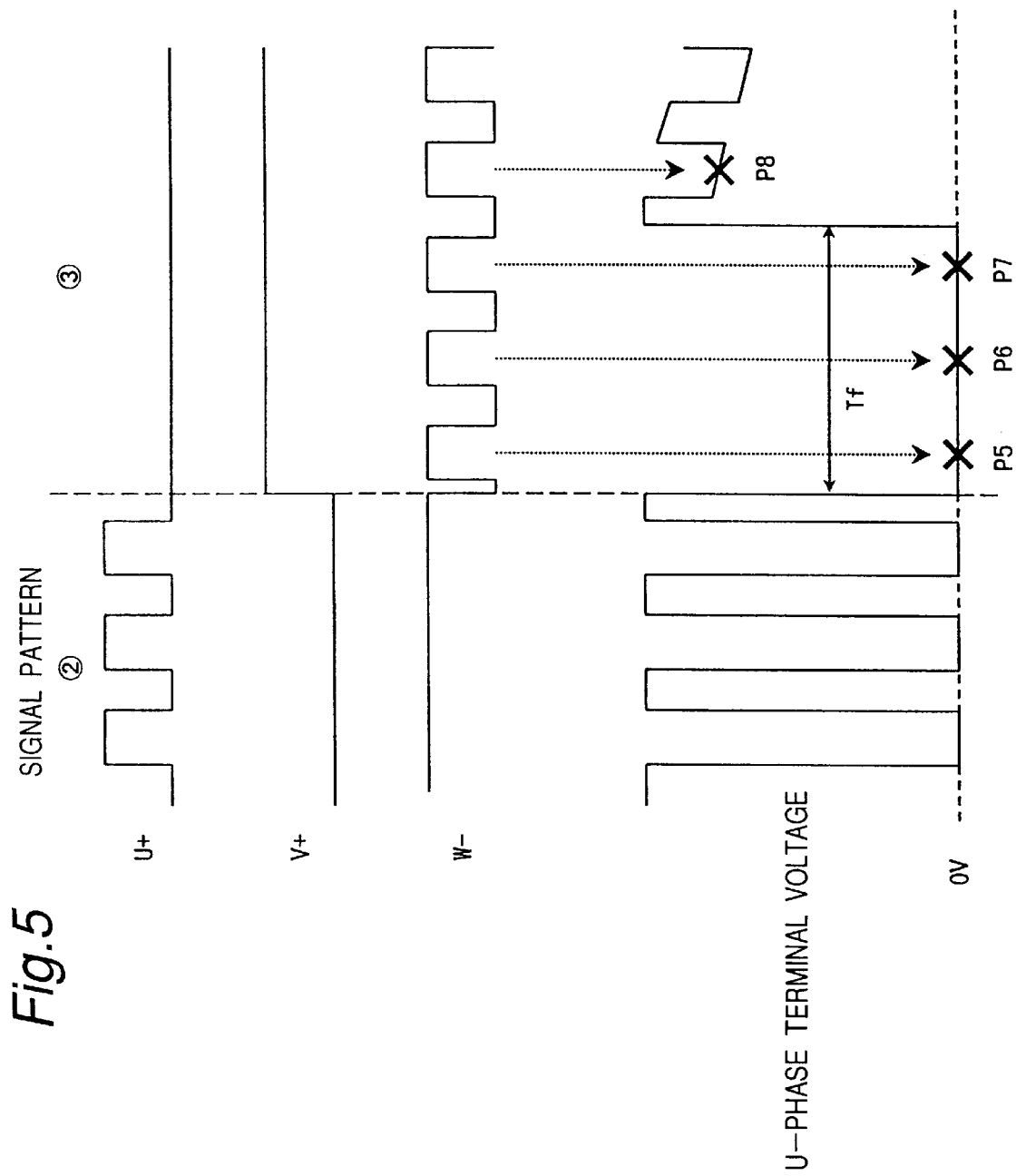
FIG. 5 is a waveform diagram when the energized phases are switched from U-W phases to V-W phases at the 120-degree energizing in the system shown in FIG. 1.

FIG. 5 illustrates the state of the transistors 12u, 12v, and 13w and the waveform of a voltage at the U-phase terminal 11u when the signal pattern for determining the switching action of the transistors is shifted from the period ② to the period ③ shown in FIG. 2, that is, from the U-W phase energization to the V-W phase energization. When the energization has been shifted from ② to ③ the DC voltage and the U-phase terminal voltage are sampled by the A/D converter 10 while the transistor 13w being turned on. The sampled terminal voltage (denoted by x) are compared with the zero potential. When the two voltages are equal, it is found that the inverter circulating current period where the free-wheel diode 15u is energized (P5 to P7 in FIG. 5) is going. Whenever the transistor 13w is switched on, the terminal voltage is sampled and compared. When the terminal voltage is far greater than the zero level (P8), it is judged that the inverter circulating current period is finished and the measured voltage is a voltage induced in the brushless motor 5.

When the sampled terminal voltage is judged as the voltage induced on the brushless motor 5, the magnetic pole position of the rotor 7 can be detected based on a value of the sampled voltage. A method of detecting the magnetic pole position from the voltage induced on the brushless motor will be explained.

Figure 6:
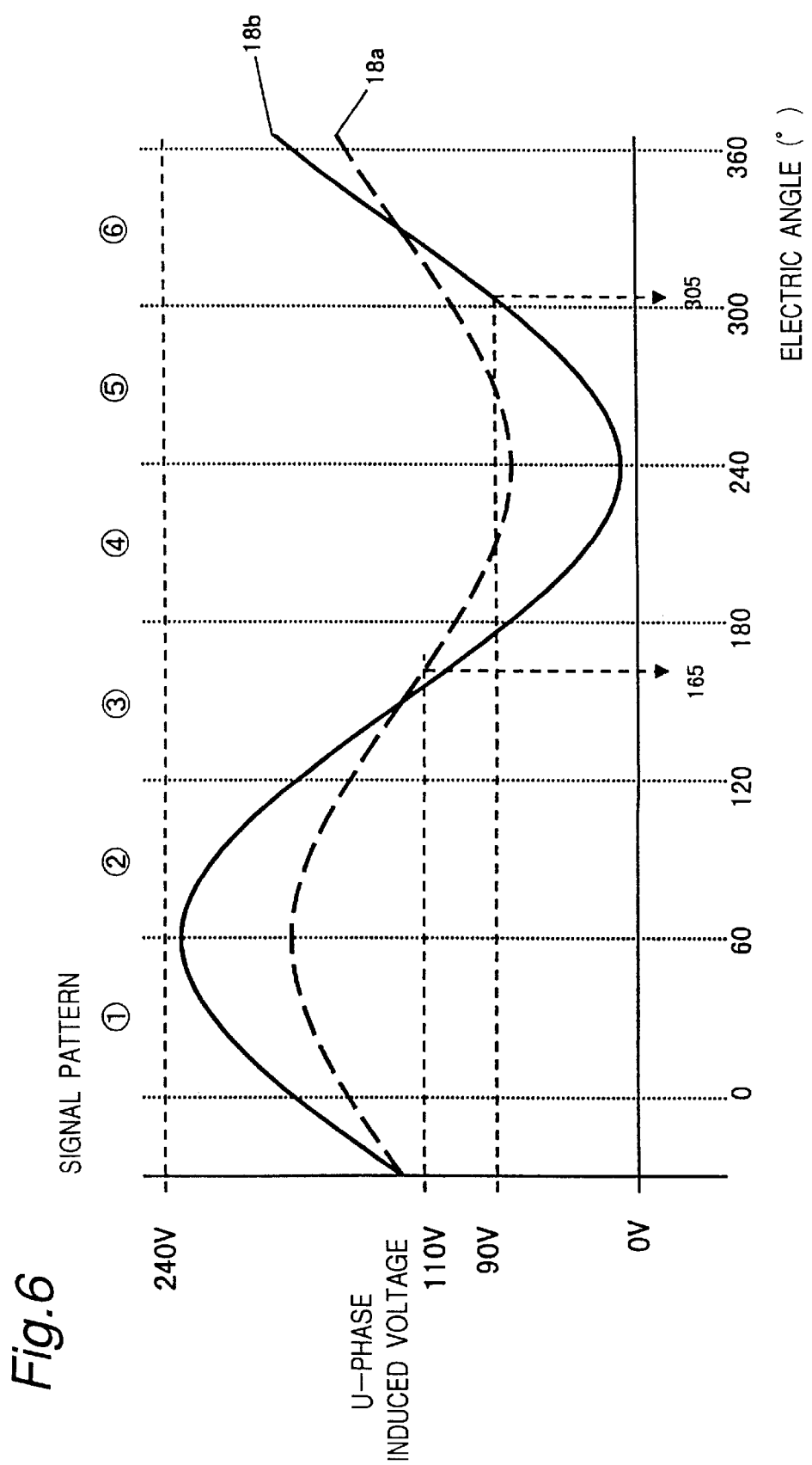
FIG. 6 is a diagram showing the relationship between the electric angle and the waveform of induced voltage in case that a brushless has the induced voltage which is a sine-wave is driven at the 120-degree energizing.

The voltage induced on the brushless motor is a voltage which is induced in the windings of the stator 6 mainly by the magnets in the rotor 7, so-called an induced voltage. The waveform of the induced voltage may necessarily be specified by the specifications of the motor including the number of windings and the material of the magnets. As shown in FIG. 6, the waveform may be expressed substantially with a sine-wave function, in which the amplitude is varied depending on the number of revolutions of the brushless motor as shown with the waveforms at 3000 rpm (the broken line 18a) and at 6000 rpm (the real line 18b). The waveforms represent the terminal voltages determined by the characteristics of the brushless motor to be used for detecting the magnetic pole position. The waveforms are stored in the form of a data table in the memory 83 of the controller 8.

In the system such as shown in FIG. 1, in case that 240 V of the DC voltage is applied to the inverter 3 for driving the brushless motor, at number of revolutions of 3000 rpm, with the inducted voltage of 110 V during the period ③, the magnetic pole position can then be determined by an electric angle of 165 degrees. During the period ⑥ at 6000 rpm with the induced voltage to be 90 V, the magnetic pole position can be determined by an electric angle of 305 degrees.

Once number of revolutions of the brushless motor is known, the magnetic pole position can be determined from the induced voltage. More specifically, according to the first embodiment, it is possible to drive a motor by making a control loop such that the magnetic pole position is determined from the voltage induced on the brushless motor, and number of revolutions is calculated by the controller 8 and used for detecting the magnetic pole position of the rotor again.

Figure 7:
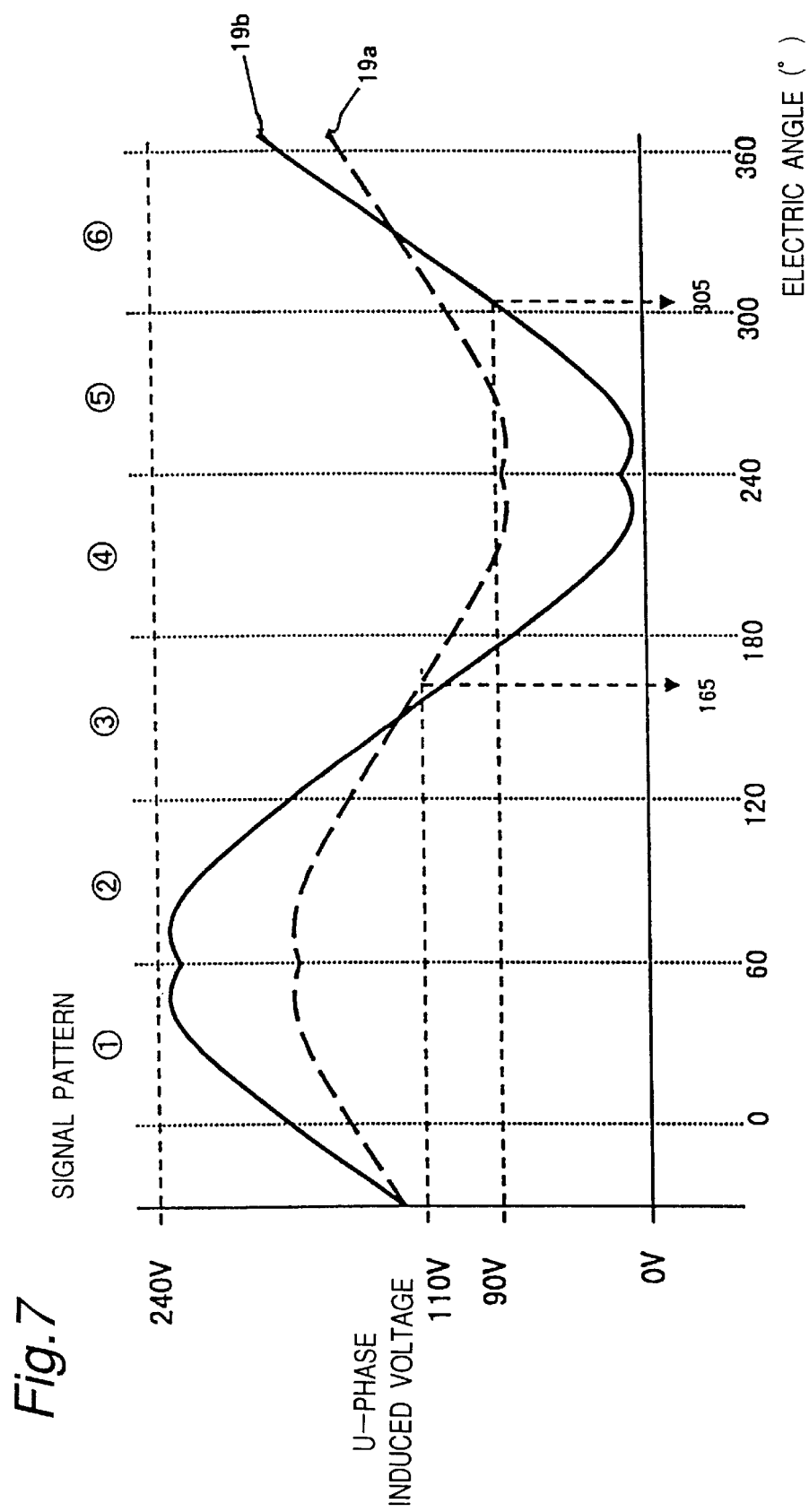
FIG. 7 is a diagram showing the relationship between the electric angle and the waveform of induced voltage in case that a brushless motor has the induced voltage which is a trapeziform wave is driven at the 120-degree energizing.

In the above description, the waveform of the induced voltage is sine-wave form shown in FIG. 6. However, the waveform which meets the characteristics of a brushless motor to be driven may preferably be used to determine the magnetic pole position, for example, a trapeziform waveform as shown in FIG. 7 may be used depending on a magnetized state of the rotor 7.

Figure 8:
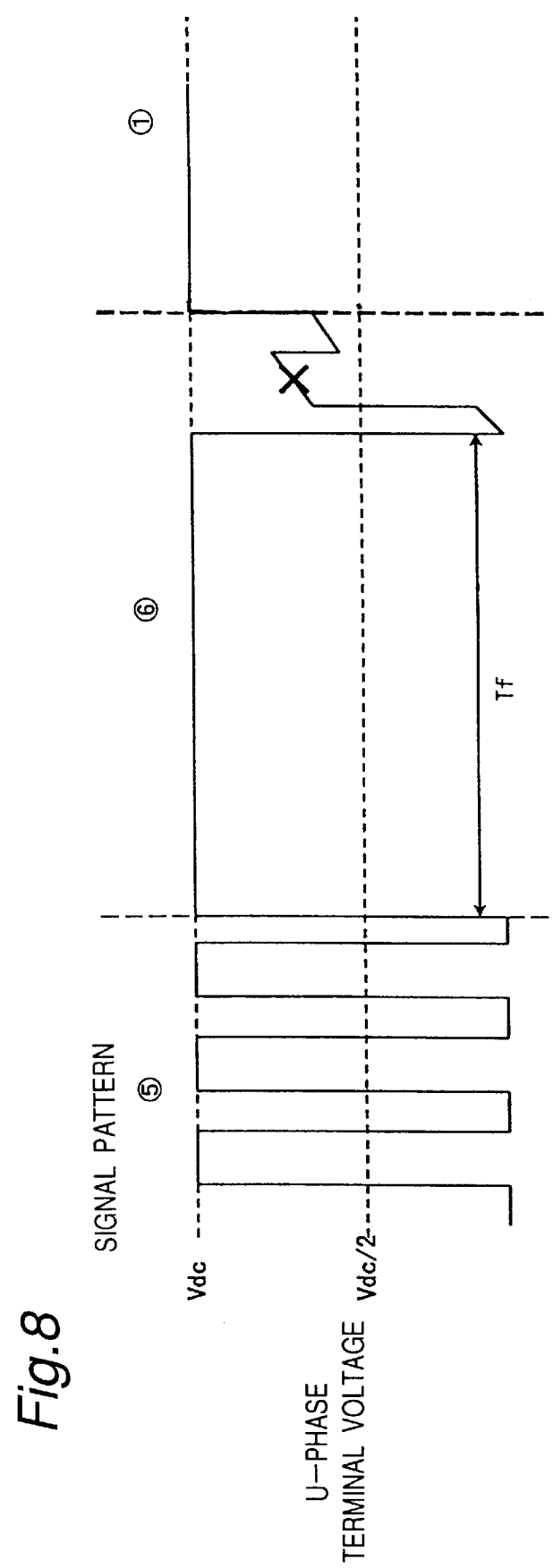
FIG. 8 is a diagram of the waveform of the terminal voltage when the brushless motor is driven at a high speed.

According to this embodiment, even if the brushless motor is driven at a higher speed and the inverter circulating current period of the terminal voltage for which no current is supplied is extended enough to envelop the zero-cross point of the induced voltage (at intersection with a half of the DC voltage), as shown in FIG. 8, the magnetic pole position of the rotor can be identified by the A/D converter's sampling the terminal voltage at a single location (denoted by "x" in FIG. 8).

Figure 9:
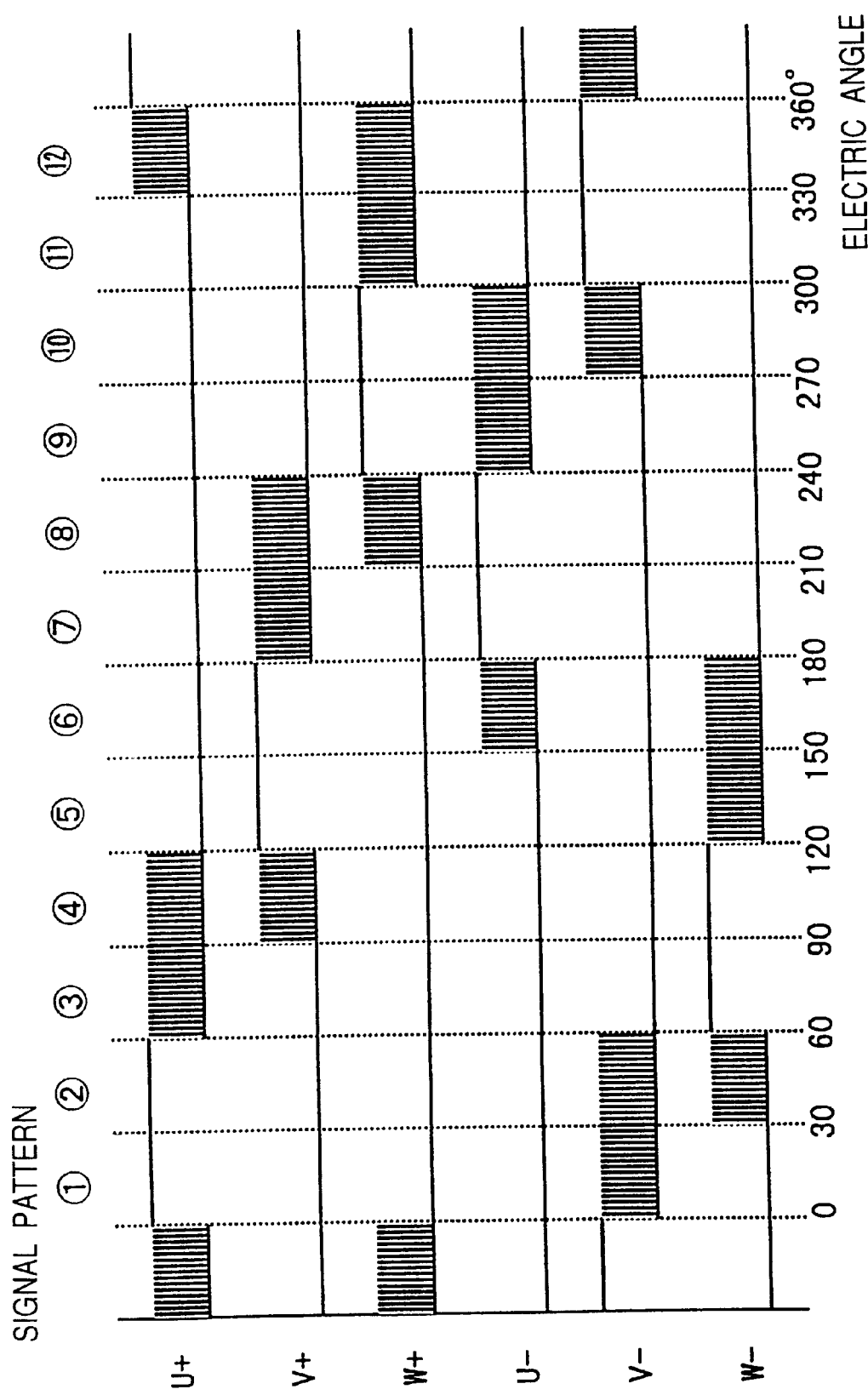
FIG. 9 is a timing chart of switching action control signals of the inverter at 150-degree energizing in the system shown in FIG. 1.
Figure 10:
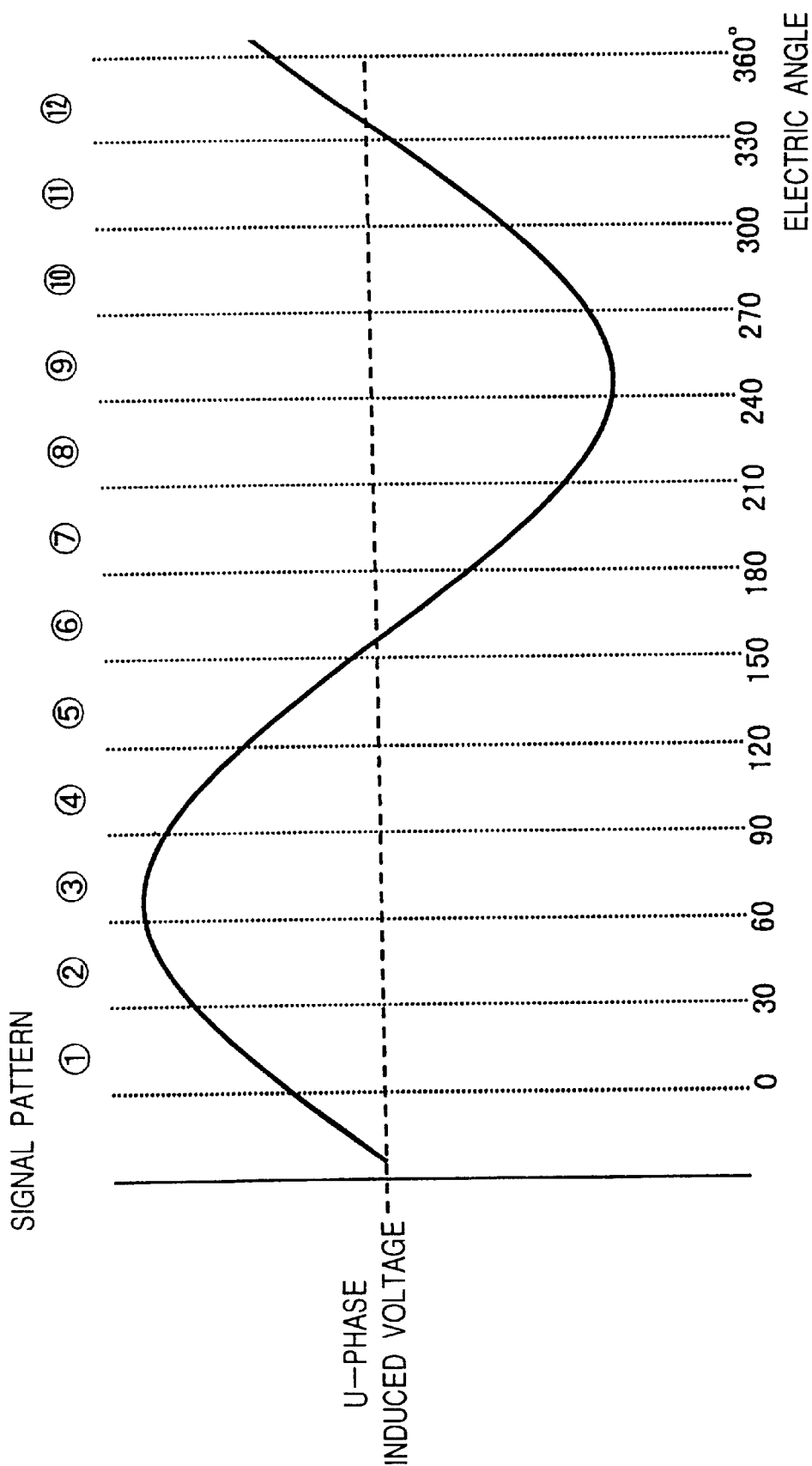
FIG. 10 is a diagram showing the relationship between the electric angle and the waveform of induced voltage in case that the brushless motor having the induced voltage which is a sine-wave is driven at the 150-degree energizing.

Also, another pattern of the control signals for determining the switching action of the transistors in the inverter 3 of this arrangement is illustrated in FIG. 9. The switching action control signals are modified such that the angle of conduction or energization for each phase is extended to have a energized period with the electric angle of 150 degrees and non-energized period with the electric angle of 30 degrees. The relationship between the switching action control signals and the induced voltage (at U-phase representatively) is shown in FIG. 10.

Figure 11:
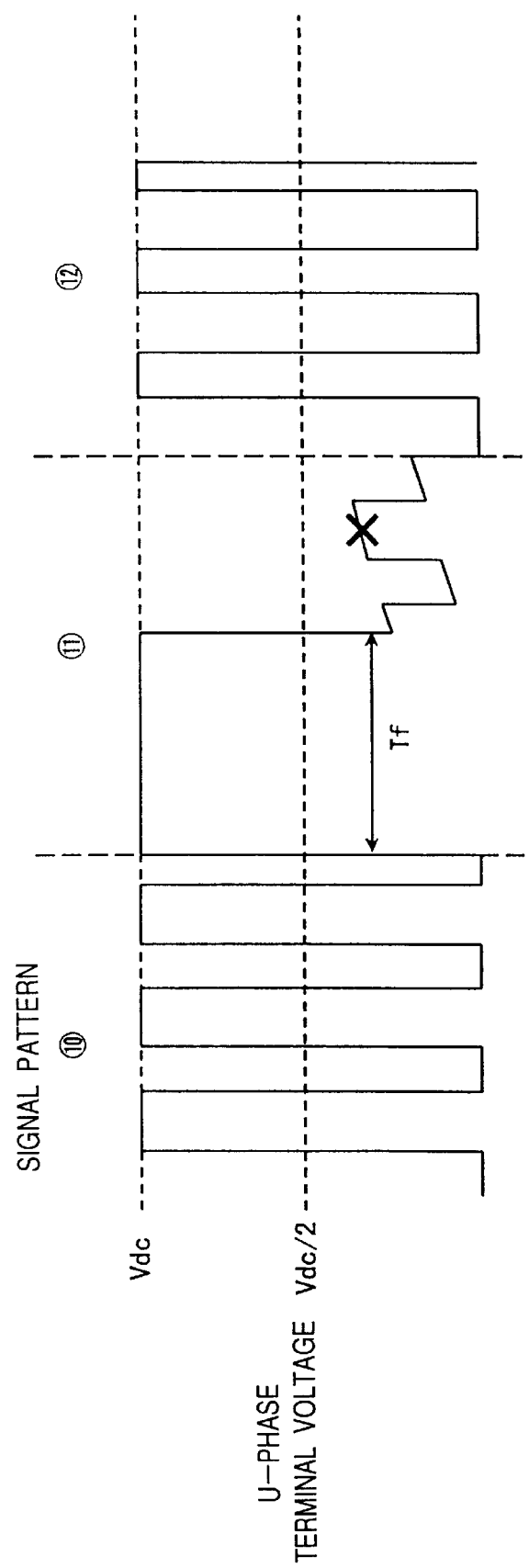
FIG. 11 is a diagram of the waveform of the terminal voltage when the brushless motor is driven at the 150-degree energizing.
Figure 12:
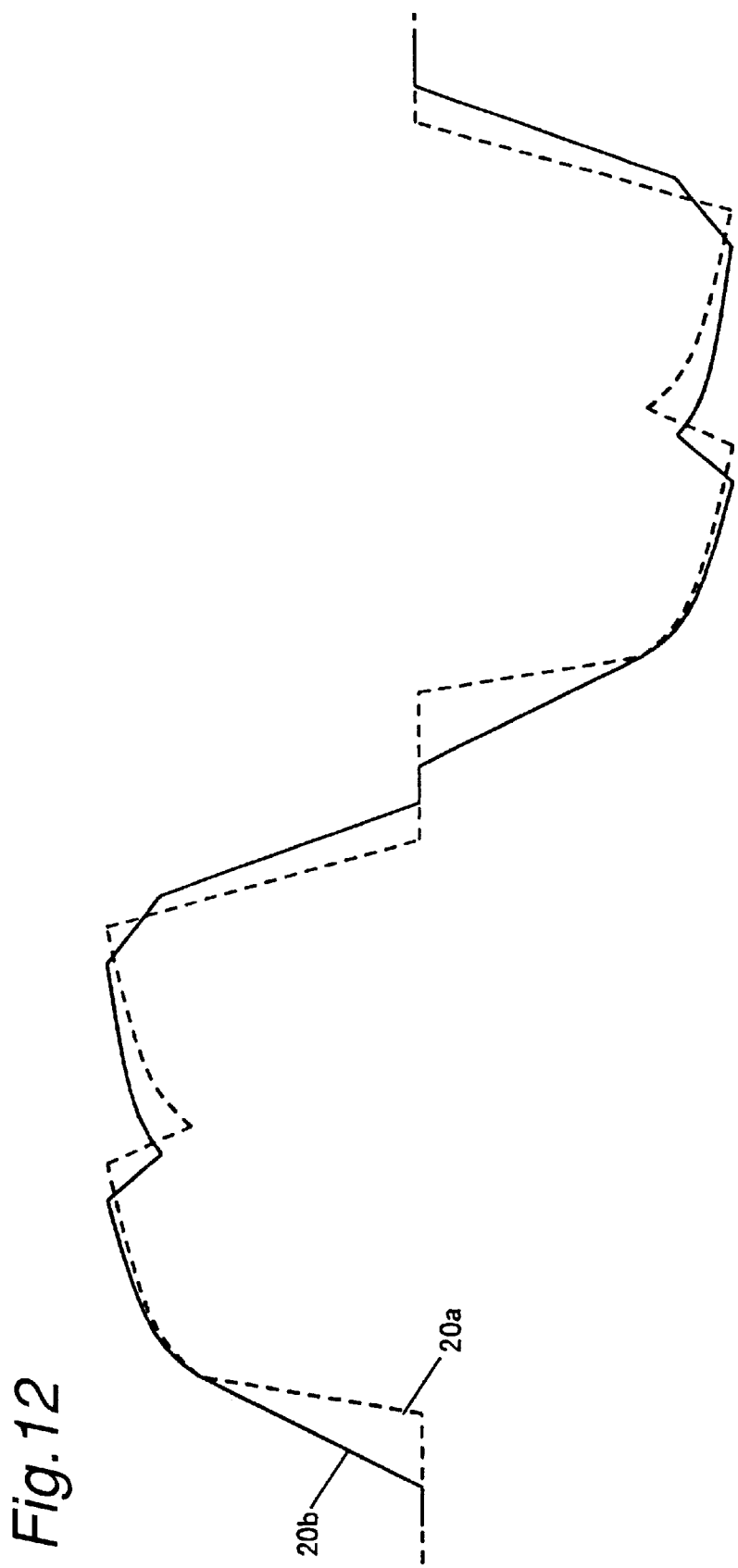
FIG. 12 is a waveform diagram of phase currents at the 120-degree energizing and the 150-degree energizing.

FIG. 11 illustrates a waveform of the terminal voltage at U-phase when the pattern of the control signals for controlling the action of the transistors is shifted from the period 10 (10 in a circle) to the period 12 (12 in a circle). As the energized period is shorter than the 120-degree energizing, the duration for which the induced voltage can be measured becomes short. As apparent from FIGS. 9 and 10, the signal pattern 11 (11 in a circle) allows the switching action to start prior to the zero-cross point of the induced voltage. Even in this case, the magnetic pole position can be detected by the A/D converter measuring at least one sample of the terminal voltage. This will permits the controlling action with a wider angle of energization.

As the angle of energization is extended, the waveform of a current for each phase (denoted by the real line 20b) can be more moderate at the rise and fall than that of the 120-degree energizing (denoted by the dotted line 20a). Since the waveform of the current is improved, it is possible to drive the brushless motor at lower noise and lower vibration.

While the angle of energization is as small as 120 degrees or 150 degrees in this embodiment, the angle may be extended up to about 180 degrees provided that the A/D converter measures at least one sample of the terminal voltage. Thus, the waveform of the current may be provided in an approximate sine-wave form close to a sine-wave, thus further decreasing the noise and vibration on the brushless motor.

Second Embodiment

Description in the first embodiment is made, supposing that the voltage generated on the brushless motor is an induced voltage developed mainly by the action of the magnets of the rotor 7. In this embodiment, assuming that high precise detection of the magnetic pole position is needed for the brushless motor which is an IPM motor having salient poles, the waveform of the terminal voltage predetermined from the characteristics of the brushless motor is considered to be a composite waveform of the induced voltage and the voltage developed by the mutual inductance of the windings of the stator 6.

Figure 13:
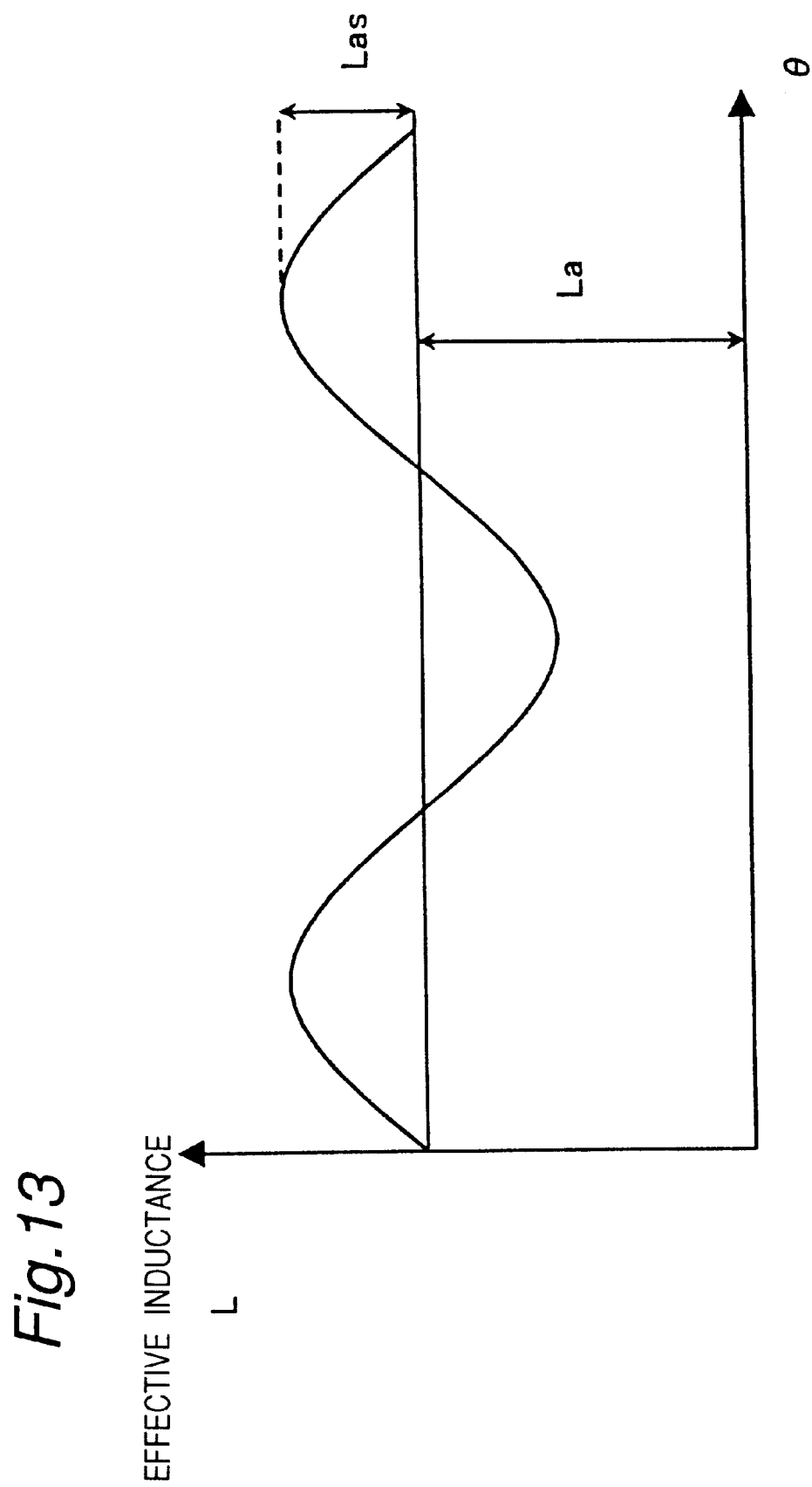
FIG. 13 is an inductance diagram of an IPM motor.

FIG. 13 illustrates an effective inductance per phase on the IPM motor. The IPM motor including the magnets embedded in the rotor 7 has large amplitude Las, the effect of which is not negligible for the terminal voltage during the non-energized period. For example, a voltage of the U-phase terminal in non-energized period is derived from a voltage equation of the IPM motor model as the following equation (A).

$$Vu=[(Vv+Vw)+3Las\{\cos(2\theta-2\pi n/3) \cdot p(iv)+\cos(2\theta+2\pi/3) \cdot p(iw)\}- 6\omega \cdot Las\{\sin(2\theta-2\pi/3) \cdot iv+\sin(2\theta+2\pi/3) \cdot iw+3\ \Phi u\}/2 \quad (A)$$

In the equation (A), the second and third terms represent voltages developed by the mutual inductance while the first and fourth terms represent the induced voltages excluding the voltage developed by the mutual inductance. Also, Vv and Vw are the terminal voltages from the neutral point, iv and iw are phase currents which flow to the neutral point along the positive direction, $\Phi u$ is the induced voltage developed by the magnets based on the neutral point, $\omega$ is the rotational speed (or number of revolutions), and p is the differential operator (d/dt).

Figure 14:
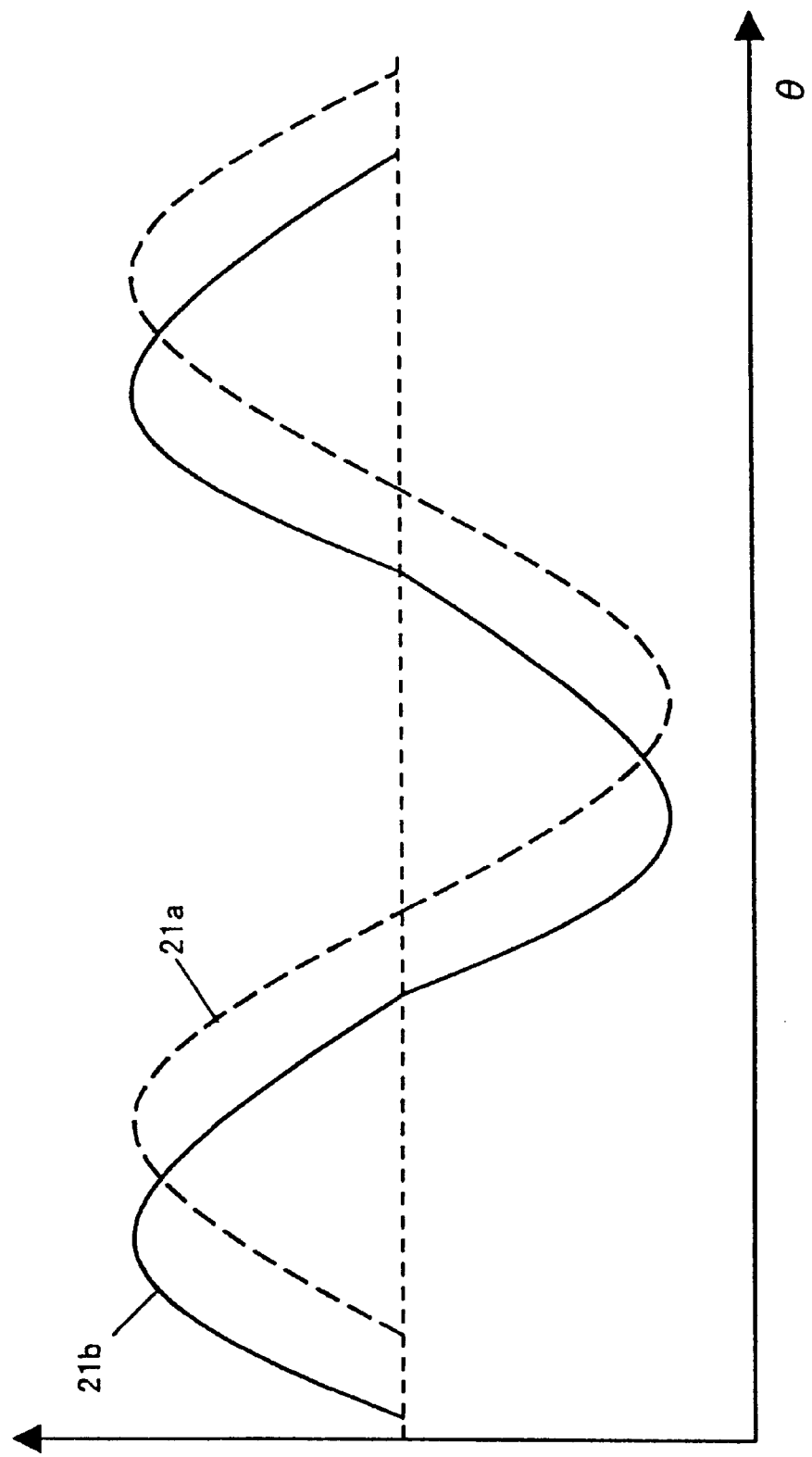
FIG. 14 is a waveform diagram showing a difference in the induced voltage between two different phase currents.

FIG. 14 illustrates comparison between a waveform 21a of the induced voltage with a flowing phase current and a waveform 21b of the induced voltage without a flowing phase current. It is proved by simulation that the waveform of the induced voltage is shifted forward in the electric angle as the phase current becomes greater. With no consideration of that fact, the induced voltage may be sampled at a delayed position of the magnetic pole when the phase current is large. As a result, the motor can not be driven at the optimum timing for energizing.

It is apparent from the equation (A) that the magnetic pole position can be detected at more accuracy when the induced voltage on the IPM brushless motor during the non-energized period is added with the voltage developed by the mutual inductance. As understood from the second and third terms of the equation (A) and FIG. 14, the induced voltage on the brushless motor during the non-energized period is varied with the rotational speed and the phase current, and therefore the detection of the magnetic pole position has to be calculated according to the rotational speed and the phase current. The system shown in FIG. 1 includes no means for detecting the phase current. Since the DC voltage applied to the main line of the inverter 3, the energizing ratio (duty ratio) in chopping at the PWM control, and the energized period for each phase winding are proportional to the phase current respectively, the above three values can substitute for the means for detecting phase current.

Third Embodiment

Figure 15:
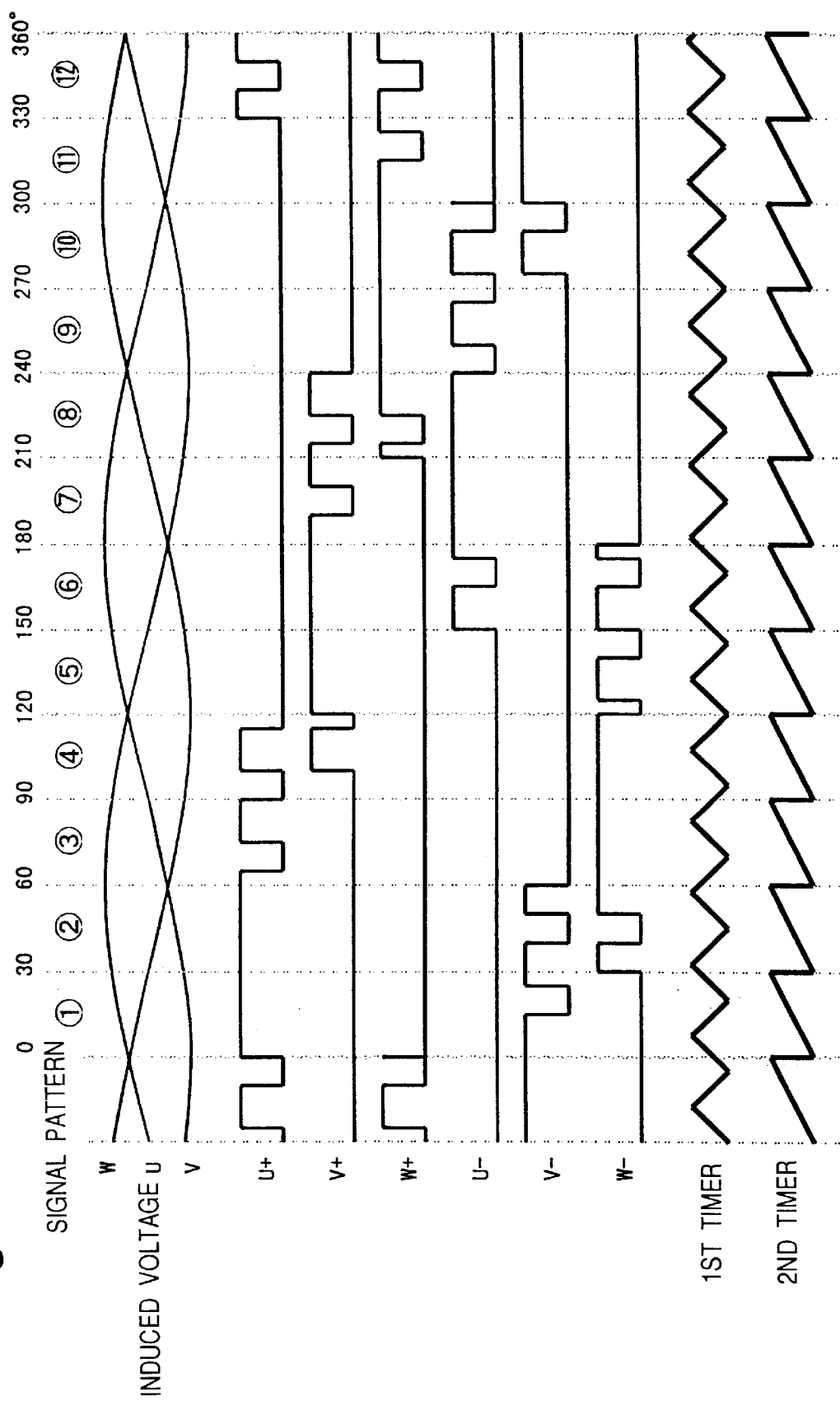
FIG. 15 is a timing chart showing the switching action control signals of the inverter and the timer action of the controller at the 150-degree energizing in the system shown in FIG. 1.

The third embodiment is arranged in which the controller 8 of the first or second embodiment is implemented by a microcomputer for inverter control. FIG. 15 illustrates the relationship between timer configuration and inverter control signals in the microcomputer for inverter control. The signal for controlling the switching action of transistors of the inverter 3 is provided for 150-degree energizing control as shown in FIG. 9. More specifically, the phase to be energized in the brushless motor is shifted depending on the magnitude of the induced voltage developed during the rotation.

Figure 16:
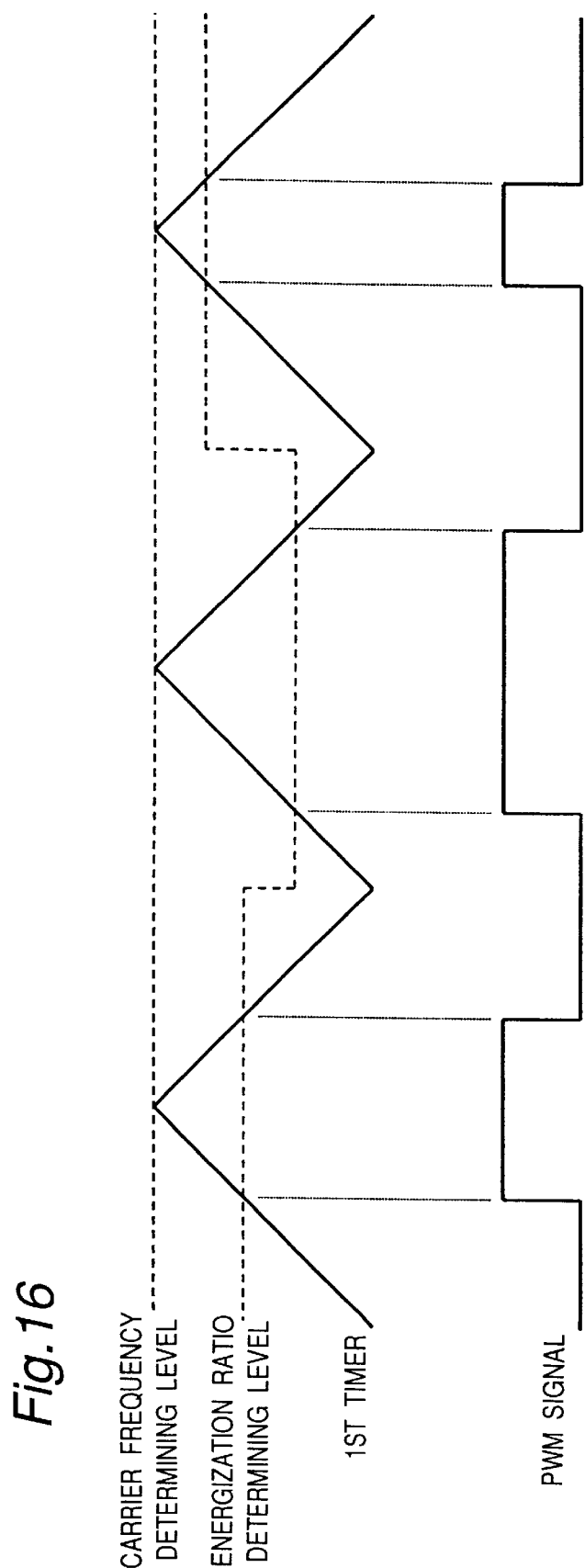
FIG. 16 is a diagram showing the relationship between a count of a first timer and a PWM signal shown in FIG. 15.

The first timer repeats counting up and down at every carrier frequency of the PWM signal. When the carrier frequency reaches a predetermined level as shown in FIG. 16, the counting is shifted from count-up to count-down. When the timer signal becomes an energizing (energization) ratio determining level, the PWM signal is inverted. The timer of this type is commonly installed in the microcomputer for inverter control.

The second timer is cleared at every 30 degrees of the electric angle depending on the number of revolutions of the brushless motor. While the second timer restarts counting up to a level equivalent to 30 degrees of the electric angle, the control signals from U+ to W− are controlled to shift the phase to be energized, and then the count is cleared.

In the system where the revolution speed of the brushless motor is controlled by keeping the carrier frequency of the PWM signal a constant level and varying the energizing ratio, the carrier period of the PWM signal is asynchronous with the timing of commutation for switching the phase to be energized. It is hence necessary for ensuring stable revolutions of the brushless motor to switch the phase to be energized from one to another precisely at the commutation timing. The phase to be energized should be switched even if the PWM signal is output at an intermediate of the carrier period, as shown in FIG. 15.

For realizing the above requirement, the first timer for determining the energizing ratio and the carrier frequency of the PWM signal and the second timer for measuring the timing of commutation for shifting the phase to be energized are provided. The structure having such two timers allows the brushless motor according to the fist or second embodiment to be driven stably.

Figure 17:
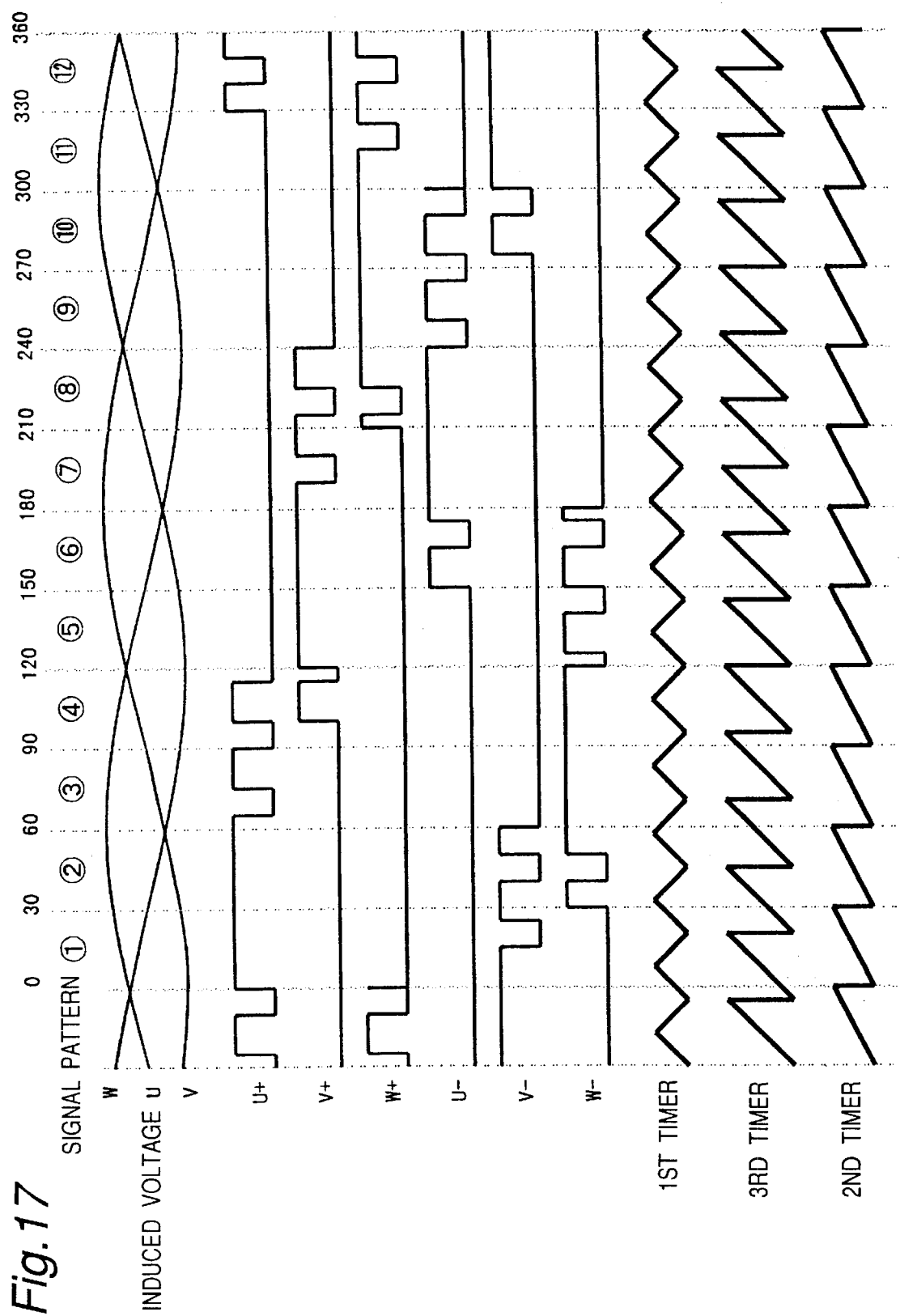
FIG. 17 is a timing chart showing the switching action control signals of the inverter and the timer actions of the controller at the 150-degree energizing in the system shown in FIG. 1.

FIG. 17 is a timing chart showing a control method of employing a third timer. The third timer is counted up in synchronism with the action of the first timer. Action of the third timer will be described in more detail referring to FIG. 18.

Figure 18:
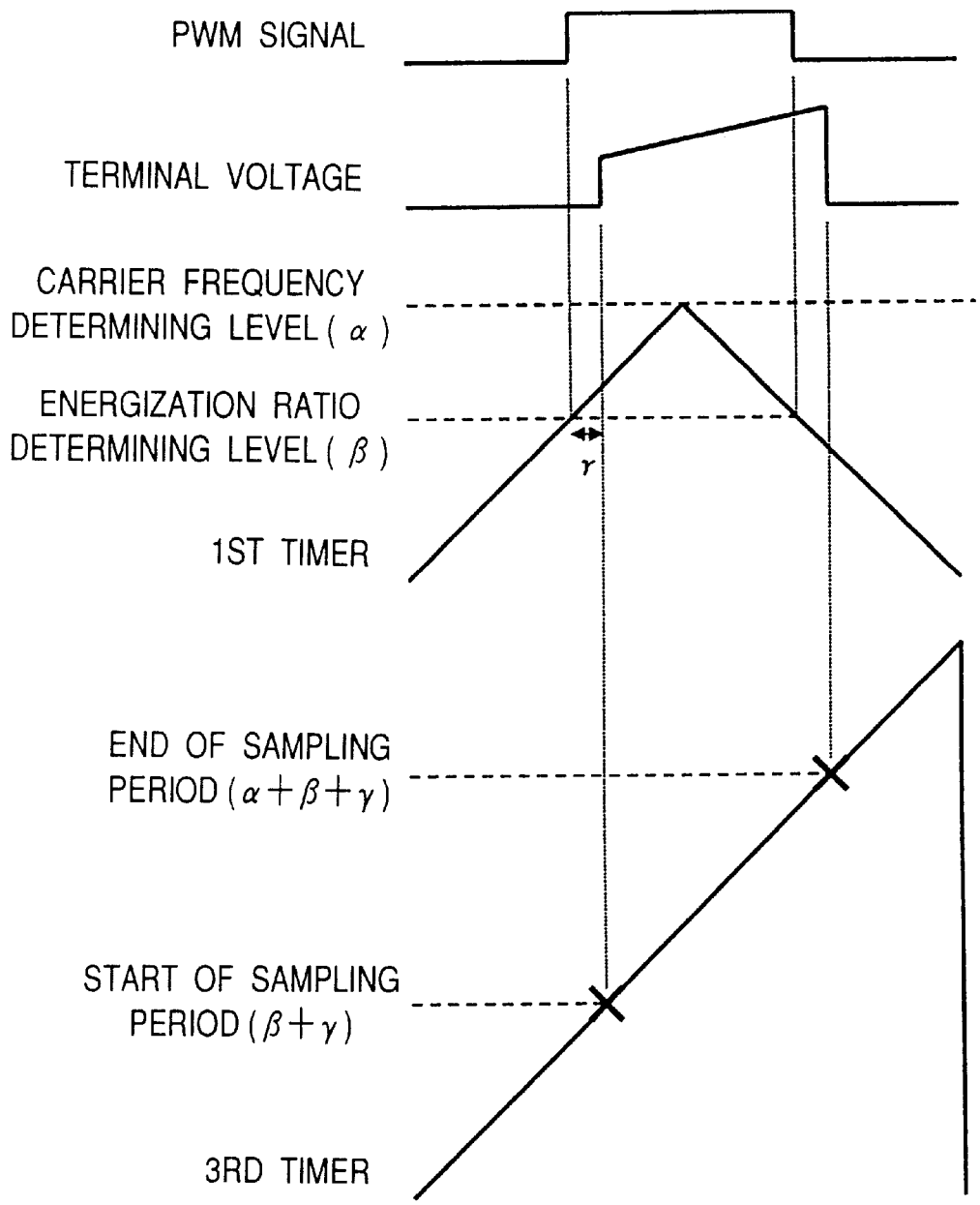
FIG. 18 is a diagram showing the relationship of the terminal voltage waveform between the first timer and a third timer shown in FIG. 17.

As shown in FIG. 18, the PWM signal is varied in synchronism with the action of the first timer. In the first or second embodiment, the voltage developed on the brushless motor is sampled over the terminal voltage and used to detect the magnetic pole position of the rotor 7. The voltage induced by the action of the brushless motor may appear out of the timing of the PWM signal. This is caused by delay of the switching action of the transistors in the inverter 3 or the effect of the time constant in a terminal voltage detector circuit.

It is thus necessary for sampling the voltage generated on the brushless motor to concern a variation in the timing. For example, assuming that the carrier frequency determining level of the first timer is $\alpha$, the energizing ratio determining level of the first timer is $\beta$, and a lag of the timing is $\gamma$, the terminal voltage can be sampled while the third timer counts from $(\beta+\gamma)$ to $(\alpha+\beta+\gamma)$.

A common microcomputer for inverter control, an event such as interruption may be enabled when the count of the first timer reaches the energization ratio determining level. However, it is impossible to generate an interruption considering a lag of the timing. Accordingly, the third timer is used for determining the timing for sampling, over the terminal voltage, the induced voltage on the brushless motor. More particularly, when the counts from the third timer reaches a timing for a start of a sampling allowable period or an end of sampling allowable period for which sampling the terminal voltage is allowed, the event such as interruption is generated to control the sampling action thus inhibiting the detection error.

The actions illustrated in FIG. 18 are permitted only during the periods denoted by odd numbers (①, ③, ⑤, . . . ) in FIGS. 15 or 17.

Figure 19:
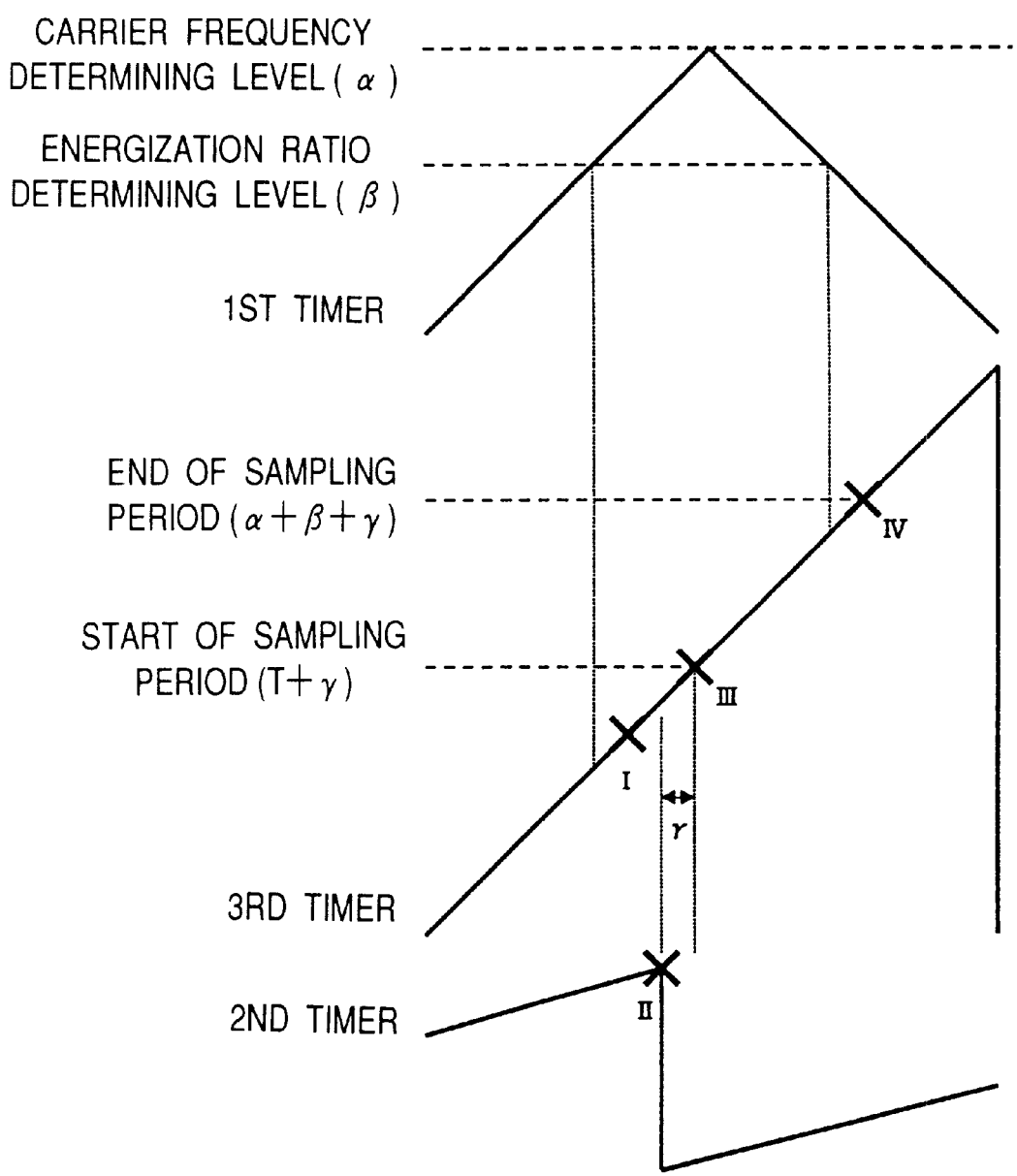
FIG. 19 is a diagram showing the relationship among the first timer, a second timer, and the third timer shown in FIG. 17.

The action of control signals when the PWM signal is shifted from the even number period to the odd number period (e.g. from ② to ③) during an active duration in FIGS. 15 or 17 will now be explained referring to FIG. 19.

Notation of "I" in the drawing represents the timing obtained by adding a lag (γ) to the energizing ratio determining level (β). It is examined at the timing whether the signal pattern is of an odd number or an even number. When the signal pattern is of an even number, it is regarded that the signal pattern is the non-energized phase, and then the sampling of the terminal voltage is not started.

When the count of the second timer for determining the timing of commutation reaches the point II of commutation, the signal pattern is turned to an odd number. It is then examined whether the PWM signal is in an active period or not. When the PWM signal is in the active period, the count (T) of the third timer at the point II is stored. Then when the count of the third timer is (T+γ) at the point III, the action of sampling the terminal voltage is started, and ended at the point IV when the count reaches (α+β+γ).

Figure 20:
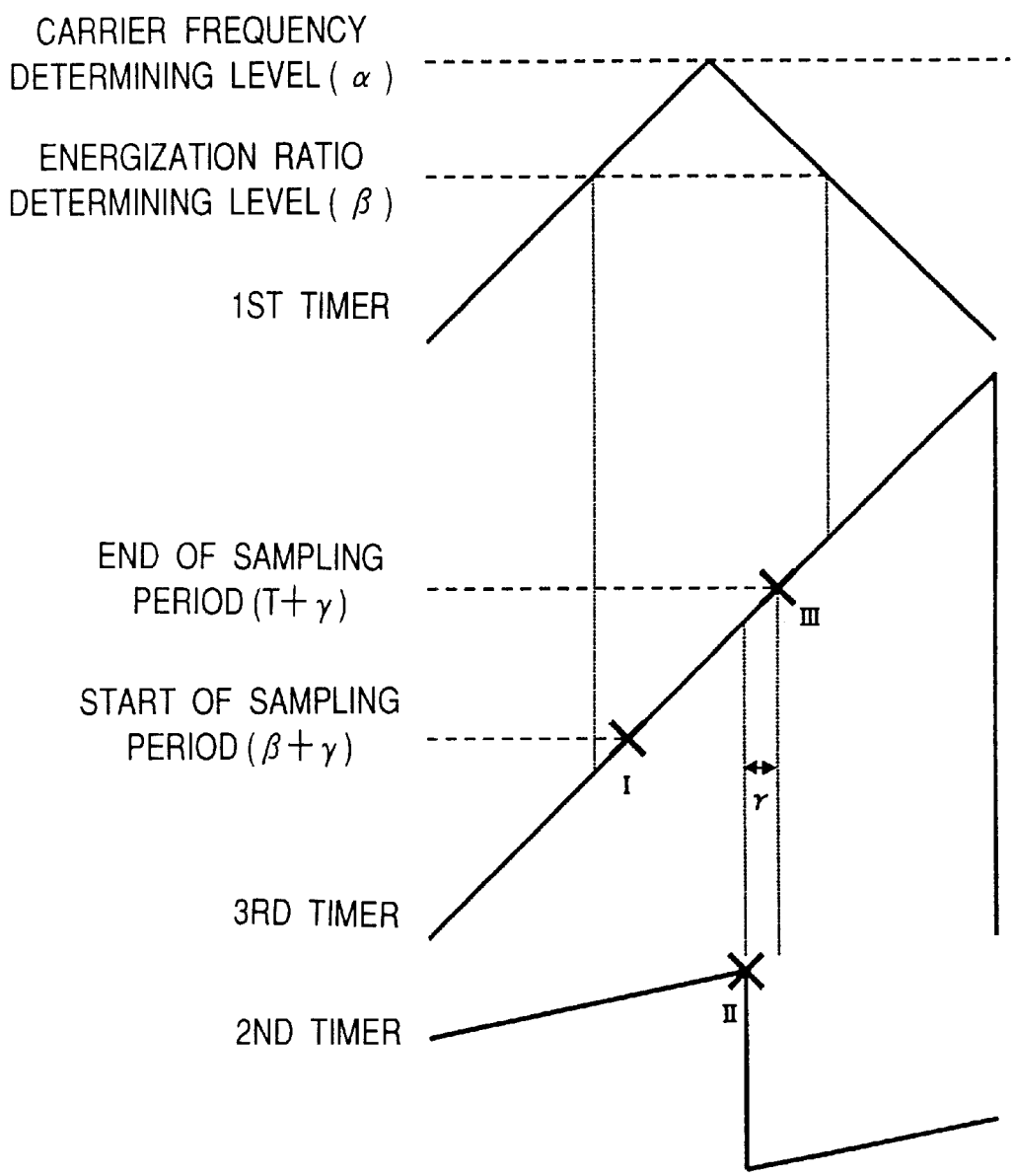
FIG. 20 is a diagram showing the relationship between the first timer, the second timer, and the third timer shown in FIG. 17.

On the contrary, in FIGS. 15 or 17, when the signal pattern is shifted from an odd number to an even number (e.g. from ① to ②) during the active period of the PWM signal, the control is done as shown in FIG. 20. The sampling of the terminal voltage is continued from the point I where the count of the third timer is (β+γ) to the point III which is obtained by adding the lag (γ) to the count (T) of the third timer at the point II for commutation by the second timer.

According to this embodiment, the controller 8 of the first or second embodiment is implemented by a common microcomputer for controlling an inverter, and hence the sampling control of the terminal voltage at less cost and with high accuracy can be provided.

Fourth Embodiment

A fourth embodiment has a variable commutation timing at which the energized phase measured by the second timer of Embodiment 3 is switched. The following is a so-called "angle-of-lead control" where the timing of commutation for switching the energized phase measured by the second timer is advanced from the induced voltage generated by the rotation of the brushless motor as shown in FIG. 21.

Figure 21:
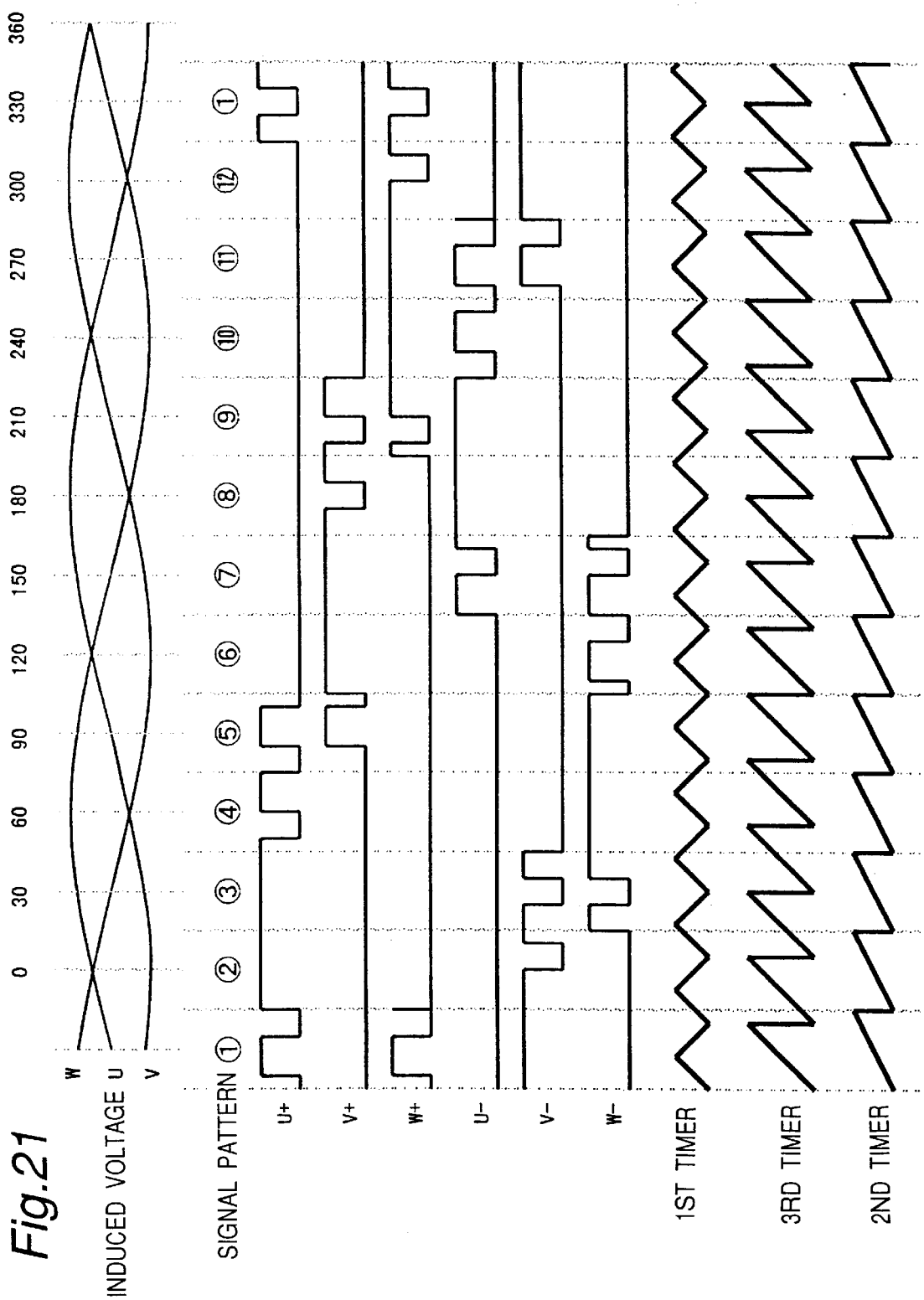
FIG. 21 is a timing chart of the signals shown in FIG. 17 with the angle of lead by 15 degrees.

FIG. 21 illustrates the timing of commutation for switching the energized phase advanced by an electric angle of 15 degrees from the timing shown in FIG. 17. In general, as the rotational speed or the phase current is increased, the peak of the efficiency of the brushless motor is obtained at a timing in which the timing of commutation for switching the energized phase is advanced from the induced voltage generated on the brushless motor. Accordingly, such the angle-of-lead control method for advancing the timing of commutation (hereinafter the amount of lead is referred to "an angle of lead") is favorably employed.

As this embodiment includes no means for detecting the phase current, the phase current is substituted with a combination of the DC voltage applied to the main lead of the inverter 3, the energizing ratio (duty ratio) for chopping in the PWM control, and the energized period for each phase winding. The angle of lead is determined from four parameters including the above three factors and the revolution speed of the brushless motor, in order to drive the brushless motor constantly at the peak efficiency. The system may be feasible with the use of at least one of the four parameters.

Figure 22A:
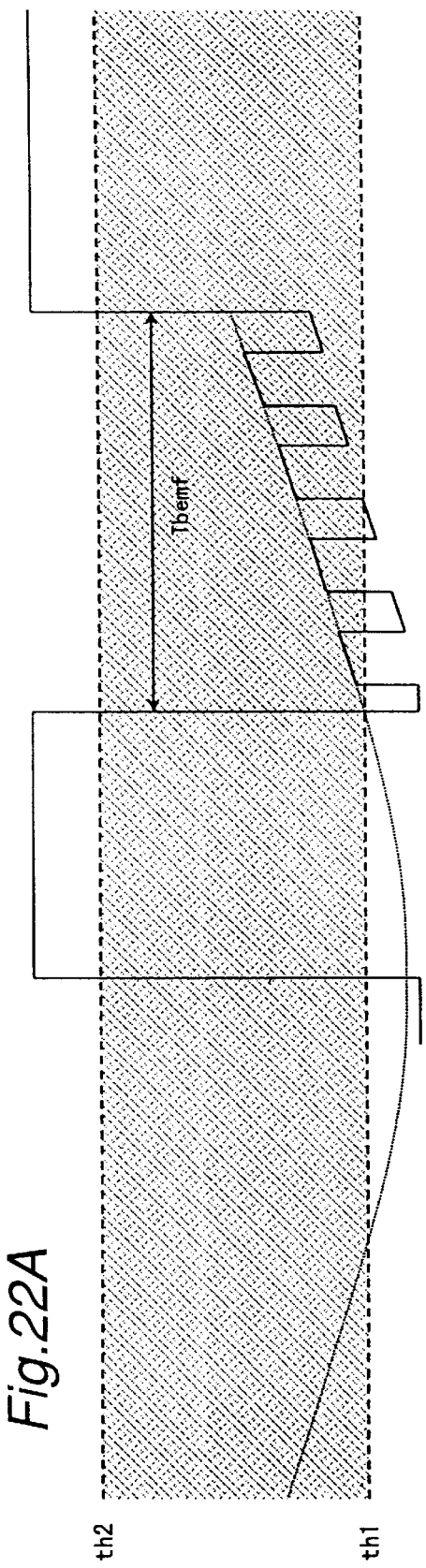
FIGS. 22A and 22B are comparison diagrams of the waveform of the terminal voltage for different angle of lead.
Figure 22B:
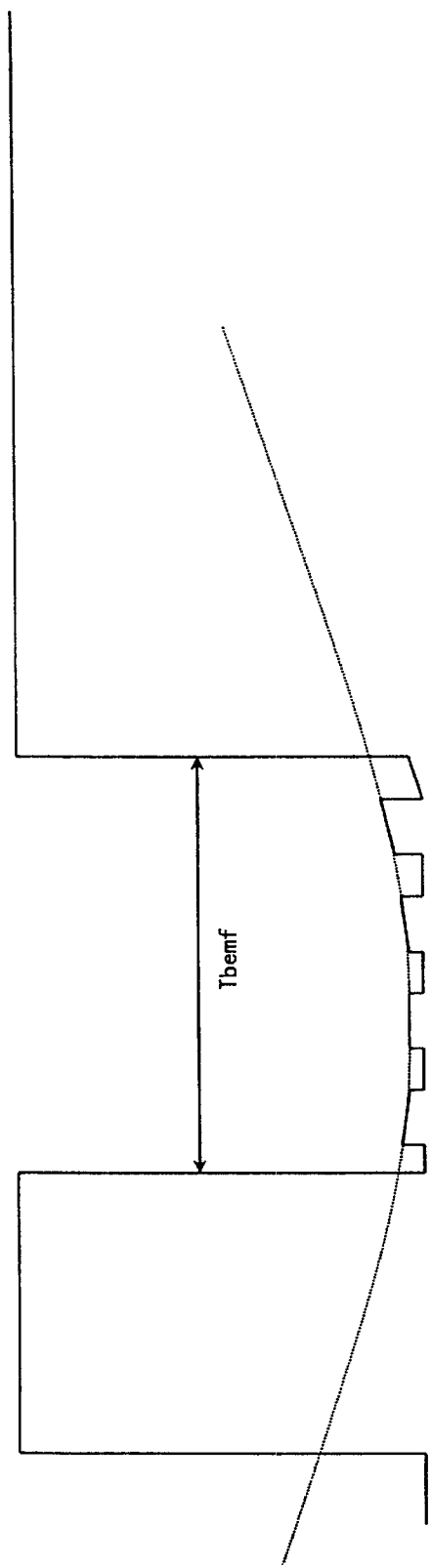

Referring to FIGS. 22A and 22B, an alternate method is described where the angle of lead is limited so that the terminal voltage for determining the magnetic pole position of the rotor is within a predetermined range.

In FIG. 22A, the voltage generated from the brushless motor which carries a data for determining the magnetic pole position in the period of Tbemf from the wave form of terminal voltage in a non-energized phase is shown. Since a change in the voltage (a gradient of the terminal voltage) relative to the electric angle is great, the position can be calculated with less angular error.

When the angle of lead is extended as shown in FIG. 22B, a change relative to the electric angle in the voltage induced on the brushless motor is small which carries a data for determining the magnetic pole position. Accordingly, the terminal voltage sampled accurately with such a method described in the third embodiment is translated to a magnetic pole position with a considerable error in the angle.

For inhibiting such an error, whenever the voltage generated from the brushless motor is sampled which carries a data for determining the magnetic pole position, the angle of lead is controlled while it is examined whether or not the sampled voltage is within a range from th1 to th2 in FIG. 22A. For example, if the sampled voltage is smaller than th1, the angle of lead is decreased. As such an action of limitation is provided, the detection of the magnetic pole position will be increased in the accuracy.

Fifth Embodiment

Figure 22C:
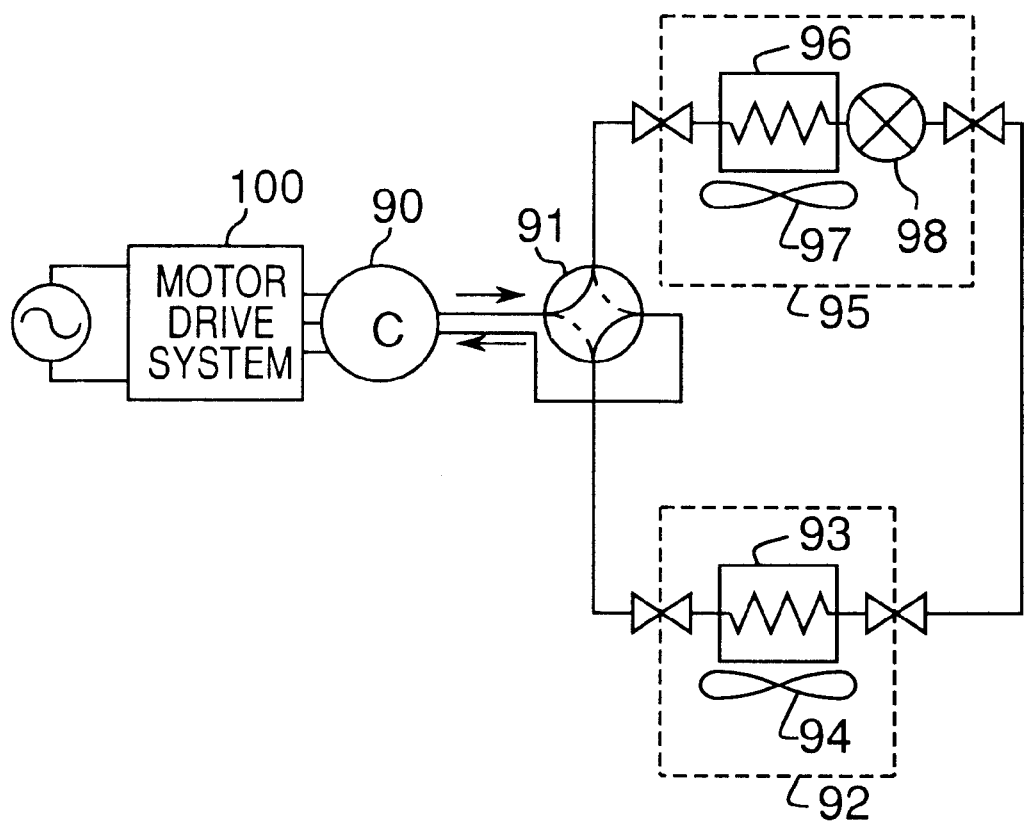
FIG. 22C is a block diagram of an air conditioner comprising the motor drive system of the invention.
Figure 23:
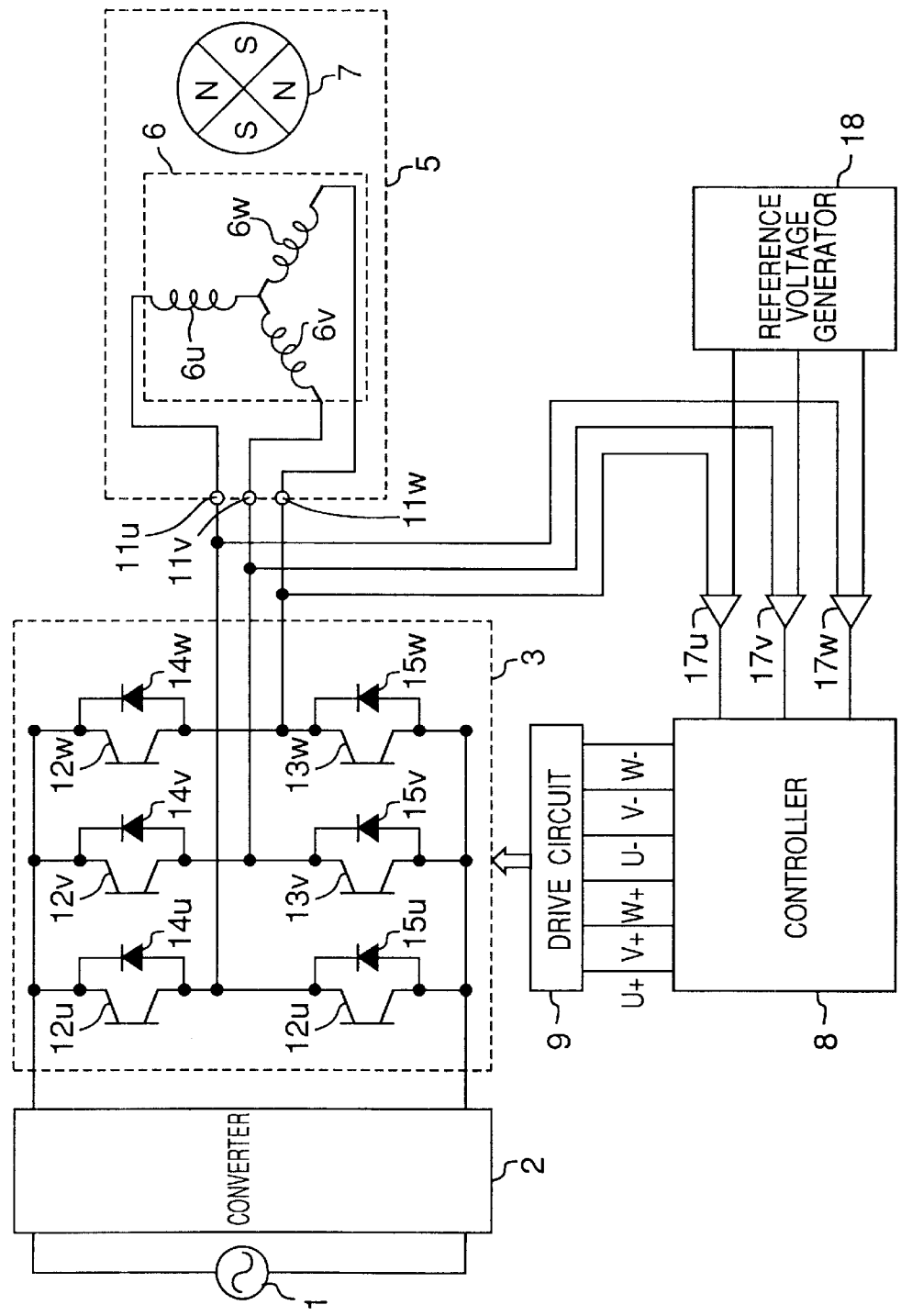
FIG. 23 is a block diagram of a conventional system.
Figure 24:
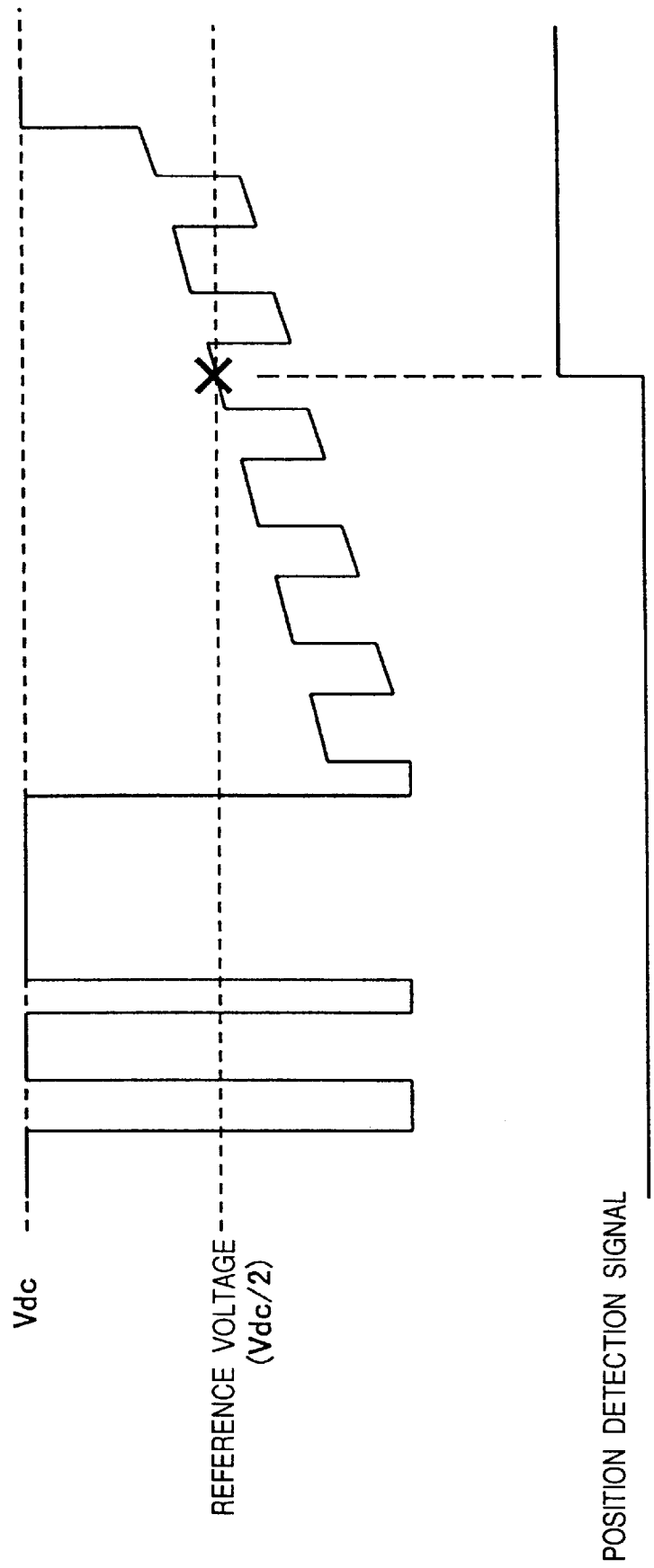
FIG. 24 is a waveform diagram of the terminal voltage and the position detection signal in the non-energized period of the conventional system.

In this embodiment, one example is described in which the motor drive system according to one of the first to fourth embodiments is applied to a drive system for a compressor motor in a refrigerating apparatus such as an air conditioner. FIG. 22C shows a structure of an air conditioner to which the motor drive system according to any one of the preceding embodiments is applied, as one example of the refrigerating apparatus. The air conditioner shown in FIG. 22C comprises the motor drive system 100 described above and a refrigeration cycle. The refrigeration cycle comprises a compressor 90, an indoor unit 92, an outdoor unit 95 and a four-way valve 91. The indoor unit 92 includes an indoor heat exchanger 93, and the outdoor unit 95 includes an outdoor heat exchanger 96 and an expansion valve 98.

Refrigerant to convey heat circulates in the refrigeration cycle. The refrigerant is compressed in the compressor 90, exchanges heat with air out of the room at the outdoor exchanger 96, and exchanges heat with air in the room at the indoor exchanger 93. Air after exchanging heat with the indoor heat exchanger 93 serves air conditioning in the room. The compressor motor 90 is driven by the motor drive system 100.

According to the refrigerating apparatus thus described, the waveform of a current flowing through the compressor motor 90 is improved to approximate to a sine-wave, and thus the noise and the vibration in the refrigerating apparatus can be reduced. Also, the high accuracy detection of the magnetic pole position allows the compressor motor 90 to operate in a condition which provides a most driving efficiency, thus contributing to the highly efficient performance of the refrigerating apparatus. Moreover, the sampling of the terminal voltage with the A/D converter causes the compressor motor 90 to rotate at a higher speed and the refrigerating apparatus can cool down to a desired temperature within a short time.

Advantages

As set forth above, the present invention is implemented by determining the inverter circulating current period from the terminal voltage and the DC voltage, using the terminal voltage after the end of the inverter circulating current period and the waveform of the terminal voltage which is predetermined from the characteristics of the brushless motor, and identifying the magnetic pole position of the rotor. This provides the following advantages.

Even when the inverter circulating current period in the waveform of the terminal voltage during the non-energized period extendes and then the zero-crossing point of the induced voltage is masked, the magnetic pole position can be determined from the terminal voltage sampled after the end of the inverter circulating current period. This allows the energization phase to be favorably switched at the timing of commutation, thus driving the brushless motor at the peak efficiency and increasing the rotational speed to a higher level.

Also, the magnetic pole position can be detected through measuring a single sample of the terminal voltage. Accordingly, the switching action can be started prior to the zero-crossing point of the induced voltage, hence increasing the angle of energization and minimizing the noise and the vibration of the brushless motor.

The waveform of the terminal voltage predetermined from the characteristics of the brushless motor may be regarded as a composite waveform of the induced voltage developed by the magnets of the rotor and the voltage developed by the mutual inductance of the windings. This will ensure the detection of the magnetic pole position at a higher accuracy in an IPM motor which has salient poles.

The ratio of energizing to each winding in the inverter may be substituted for the phase current in order to identify the waveform of the voltage developed by the mutual inductance which may vary depending on the phase current and the number of revolutions of the brushless motor. Thus, the system which needs no current sensor and is low-cost is provided.

The apparatus may have a controller for generating the PWM signal to control the inverter arranged including a first timer for determining the energizing ratio and the carrier frequency of the PWM signal and a second timer for measuring the timing for energizing the windings of the stator in a sequence. As a result, the phase to be energized can be switched at the timing of commutation during the high speed rotation of the brushless motor, regardless of the carrier frequency, hence ensuring stability of the rotation.

The controller may be equipped additionally with a third timer which is synchronous with the PWM signal and arranged for measuring the timing of detecting the terminal voltage in the non-energized phase. Accordingly, the magnetic pole position can be detected at a higher accuracy without independently of a lag of the switching action of the transistors in the inverter or the time constant of the terminal voltage detector circuit.

The timing of commutation may be variable within such a range that the terminal voltage used for detecting the magnetic pole position can stay in a predetermined range while being monitored. As a result, the error created during the translation of the terminal voltage to the magnetic pole position can be minimized thus ensuring stable drive of the brushless motor without out-of-tune.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A brushless motor driving apparatus for driving a brushless motor which includes a stator having a multiple-phase windings and a rotor having multiple-pole magnets, the apparatus detecting a magnetic pole position of the rotor and switching the winding of the stator to be energized seriatim according to the detected magnetic pole position through an inverter, the apparatus comprising:
   a DC voltage detector for detecting a DC voltage applied to a main line of the inverter;
   a terminal voltage detector for detecting a terminal voltage in a non-energizing phase of the windings of the stator;
   a circulating current period determining section for determining a circulating current period for which a circulating current is flowing according to the DC voltage and the terminal voltage;
   a memory for storing data of a waveform of the terminal voltage predetermined from characteristics of the brushless motor; and
   a magnetic pole position detector for identifying the magnetic pole position of the rotor based on the terminal voltage after the end of the circulating current period and the waveform of a terminal voltage predetermined from characteristics of the brushless motor.

2. The apparatus according to claim 1, wherein the waveform of the terminal voltage predetermined from the characteristics of the brushless motor is a waveform of a voltage induced by the magnets of the rotor.

3. The apparatus according to claim 1, wherein the waveform of the terminal voltage predetermined from the characteristics of the brushless motor is a combined waveform of a waveform of a voltage induced by the magnets of the rotor and a waveform of a voltage generated by a mutual inductance of the windings.

4. The apparatus according to claim 2, wherein the waveform of a voltage induced by the magnets of the rotor is expressed by a sine-wave function.

5. The apparatus according to claim 2, wherein the waveform of a voltage induced by the magnets of the rotor is calculated from a rotational speed of the brushless motor.

6. The apparatus according to claim 3, wherein the waveform of the voltage generated by the mutual inductance of the windings is calculated from the DC voltage applied to the main line of the inverter, a period to be energized, energizing ratio for each winding, and a rotational speed of the brushless motor.

7. The apparatus according to claim 1, further comprising a controller for generating a PWM signal which controls the inverter, the controller including a first timer for determining the energizing ratio and a carrier frequency of the PWM signal, and a second timer for determining a timing of switching the winding of the stator to be energized.

8. The apparatus according to claim 1, further comprising a controller for generating a PWM signal which controls the inverter, the controller including a first timer for determining the energizing ratio and a carrier frequency of the PWM signal, a second timer for determining a timing of switching the winding of the stator to be energized, and a third timer synchronized with the PWM signal for determining a timing of measuring a terminal voltage of a n on-energized phase of the winding.

9. The apparatus according to claim 7, wherein the timing of switching the winding of the stator to be energized is variable depending on at least one parameter of the DC voltage applied to the main line of the inverter, a period to be energized an d an energizing ratio of each winding, and a rotation speed of the brushless motor.

10. The apparatus according to claim 9, wherein a variable range of the timing of switching the winding of the stator to be energized is limited in a specific range so that the terminal voltage for identifying the magnetic pole position of the rotor stays in a predetermined range.

11. A refrigerating system employing the brushless motor driving apparatus according to claim 1.

12. A brushless motor driving method of driving a brushless motor which includes a stator having a multiple-phase windings and a rotor having multiple-pole magnets, the method comprising detecting a magnetic pole position of the rotor and switching the winding of the stator to be energized seriatim according to the detected magnetic pole position through an inverter, the method comprising:

detecting a DC voltage applied to a main line of the inverter;

detecting a terminal voltage in a non-energizing phase of the windings of the stator;

determining a circulating current period for which a circulating current is flowing according to the DC voltage and the terminal voltage; and identifying the magnetic pole position of the rotor based on the terminal voltage after the end of the circulating current period and a waveform of a terminal voltage predetermined from characteristics of the brushless motor.

13. The method according to claim 12, wherein the waveform of the terminal voltage predetermined from the characteristics of the brushless motor is a waveform of a voltage induced by the magnets of the rotor.

14. The method according to claim 12, wherein the waveform of the terminal voltage predetermined from the characteristics of the brushless motor is a combined waveform of a waveform of a voltage induced by the magnets of the rotor and a waveform of a voltage generated by a mutual inductance of the windings.

15. The method according to claim 13, wherein the waveform of a voltage induced by the magnets of the rotor is expressed by a sine-wave function.

16. The method according to claim 13, wherein the waveform of a voltage induced by the magnets of the rotor is calculated from a rotational speed of the brushless motor.

17. The method according to claim 14, wherein the waveform of the voltage generated by the mutual inductance of the windings is calculated from the DC voltage applied to the main line of the inverter, a period to be energized, energizing ratio for each winding, and a rotational speed of the brushless motor.

18. The apparatus according to claim 3, wherein the waveform of a voltage induced by the magnets of the rotor is expressed by a sine-wave function.

19. The apparatus according to claim 3, wherein the waveform of a voltage induced by the magnets of the rotor is calculated from a rotational speed of the brushless motor.

20. The apparatus according to claim. 8, wherein the timing of switching the winding of the stator to be energized is variable depending on at least one parameter of the DC voltage applied to the main line of the inverter, a period to be energized and an energizing ratio of each winding, and a rotation speed of the brushless motor.

21. The method according to claim 14, wherein the waveform of a voltage induced by the magnets of the rotor is expressed by a sine-wave function.

22. The method according to claim 14, wherein the waveform of a voltage induced by the magnets of the rotor is calculated from a rotational speed of the brushless motor.

23. The apparatus according to claim 3, further comprising a controller for generating a PWM signal which controls the inverter, the controller including a first timer for determining the energizing ratio and a carrier frequency of the PWM signal, and a second timer for determining a timing of switching the winding of the stator to be energized.

24. The apparatus according to claim 3, further comprising a controller for generating a PWM signal which controls the inverter, the controller including a first timer for determining the energizing ratio and a carrier frequency of the PWM signal, a second timer for determining a timing of switching the winding of the stator to be energized, and a third timer synchronized with the PWM signal for determining a timing of measuring a terminal voltage of a non-energized phase of the winding.

25. A refrigerating system employing the brushless motor driving apparatus according to claim 8.

* * * * *